(12) United States Patent
Sakakibara

(10) Patent No.: US 8,450,961 B2
(45) Date of Patent: May 28, 2013

(54) POWER CONVERTING APPARATUS

(75) Inventor: Kenichi Sakakibara, Shiga (JP)

(73) Assignee: Daikin Industries, Ltd., Osaka-Shi (JP)

( * ) Notice: Subject to any disclaimer, the term of this patent is extended or adjusted under 35 U.S.C. 154(b) by 442 days.

(21) Appl. No.: 12/934,915

(22) PCT Filed: Mar. 11, 2009

(86) PCT No.: PCT/JP2009/054674
§ 371 (c)(1),
(2), (4) Date: Sep. 27, 2010

(87) PCT Pub. No.: WO2009/119321
PCT Pub. Date: Oct. 1, 2009

(65) Prior Publication Data
US 2011/0025246 A1   Feb. 3, 2011

(30) Foreign Application Priority Data

Mar. 28, 2008  (JP) .................................. 2008-086354
Nov. 18, 2008  (JP) .................................. 2008-294180

(51) Int. Cl.
*H02M 5/453* (2006.01)

(52) U.S. Cl.
USPC ............................. 318/504; 318/479; 363/74

(58) Field of Classification Search
USPC .... 318/437, 442, 459, 478, 479, 504; 363/34, 363/35, 36, 74
See application file for complete search history.

(56) References Cited

U.S. PATENT DOCUMENTS

| | | | | |
|---|---|---|---|---|
| 4,740,881 A | * | 4/1988 | Park et al. | 363/138 |
| 4,779,034 A | * | 10/1988 | Shepard, Jr. | 318/804 |
| 4,823,068 A | * | 4/1989 | Delmerico et al. | 318/807 |
| 8,310,848 B2 | * | 11/2012 | Sakakibara | 363/37 |
| 2009/0086515 A1 | | 4/2009 | Sakakibara | |
| 2009/0175059 A1 | | 7/2009 | Sakakibara | |

FOREIGN PATENT DOCUMENTS

| | | | |
|---|---|---|---|
| JP | 5-56682 | A | 3/1993 |
| JP | 2524771 | B2 | 8/1996 |
| JP | 2000-341967 | A | 12/2000 |
| JP | 2004-222337 | A | 8/2004 |
| JP | 2004-266972 | A | 9/2004 |
| JP | 3806872 | B2 | 8/2006 |

(Continued)

OTHER PUBLICATIONS

Simonelli et al., "An Alternative Bus Clamp for Resonant DC-Link Converters", IEEE Transactions on Power Electronics, vol. 9, No. 1, Jan. 1994, pp. 56-63.

(Continued)

*Primary Examiner* — Bentsu Ro
(74) *Attorney, Agent, or Firm* — Birch, Stewart, Kolasch & Birch, LLP

(57) ABSTRACT

A converter and an inverter are connected via a clamp circuit. The converter performs commutation in accordance with any of a first commutation mode in which trapezoidal waves are compared with a carrier and a 120-degree conduction mode. A diode of the clamp circuit is short-circuited by a shorting switch. The shorting switch is rendered conductive when a power factor reduces or a power supply voltage reduces, and capacitors of the clamp circuit are connected in series between DC power supply lines. The converter performs commutation in accordance with the 120-degree conduction mode, not in accordance with the first commutation mode, while the shorting switch is conductive.

16 Claims, 19 Drawing Sheets

FOREIGN PATENT DOCUMENTS

| | | |
|---|---|---|
| JP | 2007-295686 A | 11/2007 |
| JP | 2007-312589 A | 11/2007 |
| WO | WO 2007/123118 A1 | 11/2007 |
| WO | WO 2007/123204 A1 | 11/2007 |

OTHER PUBLICATIONS

Itoh et al., "Decoupling Control of Input and Output Reactive Power of the Matrix Converter", IEEJ Technical Meeting on Semiconductor Power Converter, SPC-01-121, 2001, pp. 47-52.

Kato et al., "Improvement of Waveform for a Boost Type AC/DC/AC Direct Converter Focused on Input Current", IEEJ Industry Applied Section Meeting, 1-31, 2007, pp. 279-282.

Kato et al., Improvement of Waveform for a Boost Type AC/DC/AC Direct Converter, IEEJ National Convention 4-098, 2007, pp. 153-154.

Kim et al., "AC/AC Power Conversion Based on Matrix Converter Topology with Unidirectional Switches", IEEE Trans. on Industry Applications, vol. 36, No. 1, 2000, pp. 139-145.

Takeshita et al., "PWM Scheme for Current Source Three-Phase Inverters and Converters", IEEJ Transactions on Industry Applications, vol. 116, No. 1, 1996, pp. 106-107.

Wei et al., "A Novel Matrix Converter Topology with Simple Commutation", IEEE IAS, vol. 3, 2001, pp. 1749-1754.

* cited by examiner

F I G. 5
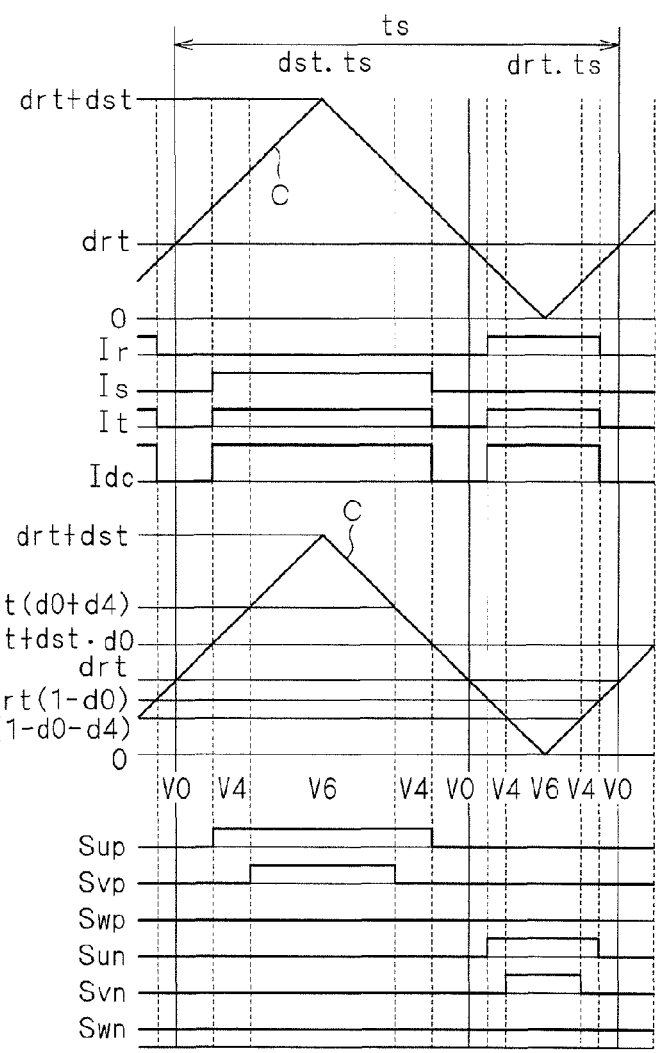

F I G . 1 0
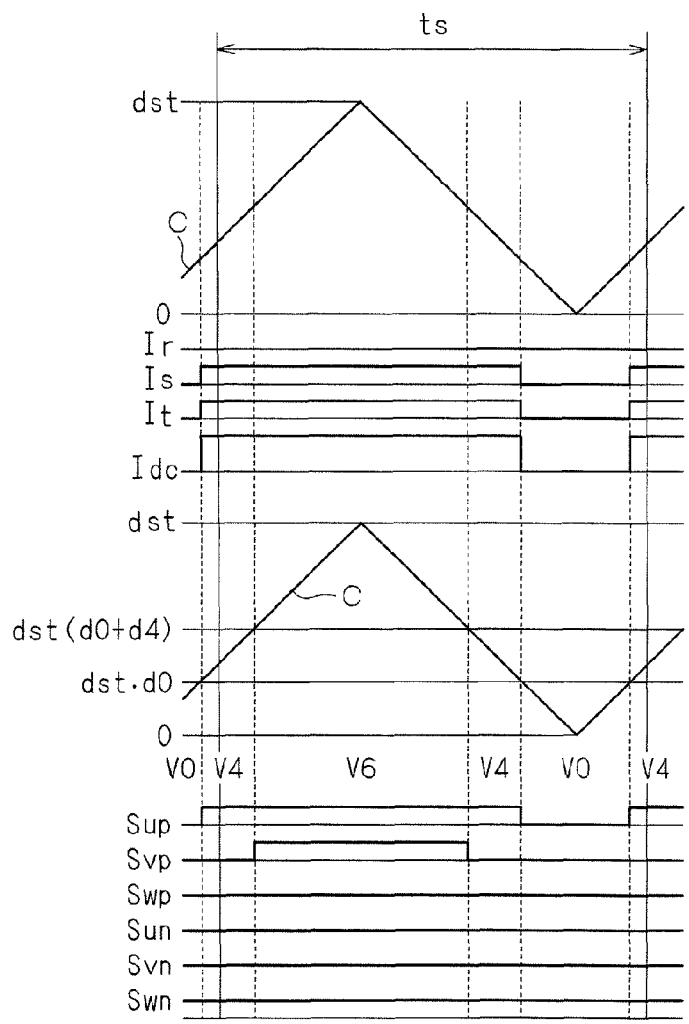

F I G. 1 2
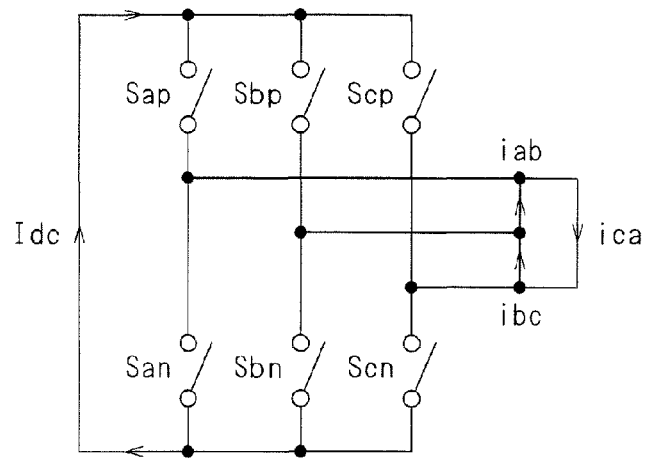
F I G. 1 3
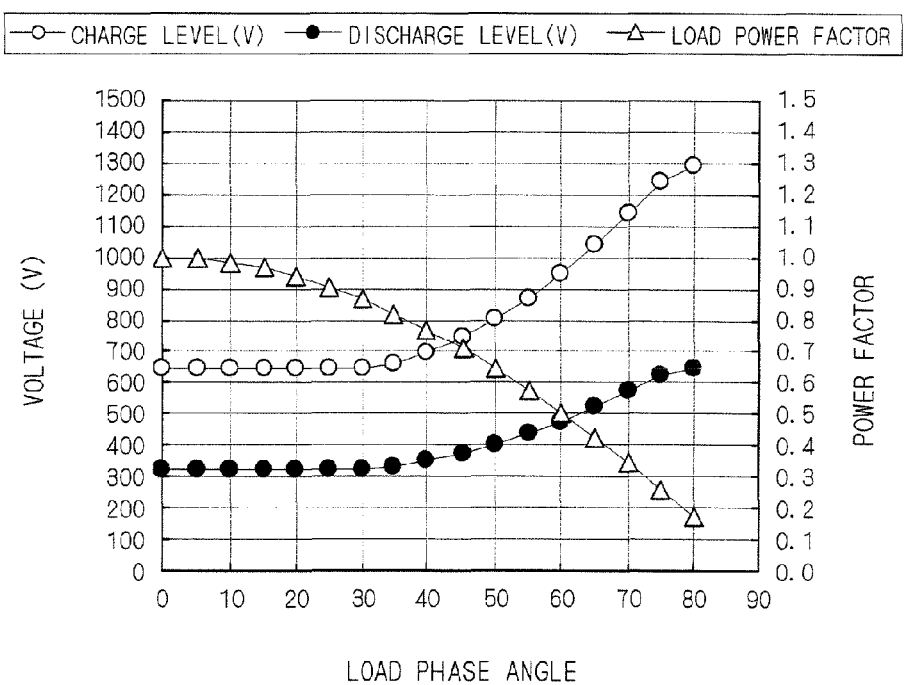
LOAD PHASE ANGLE

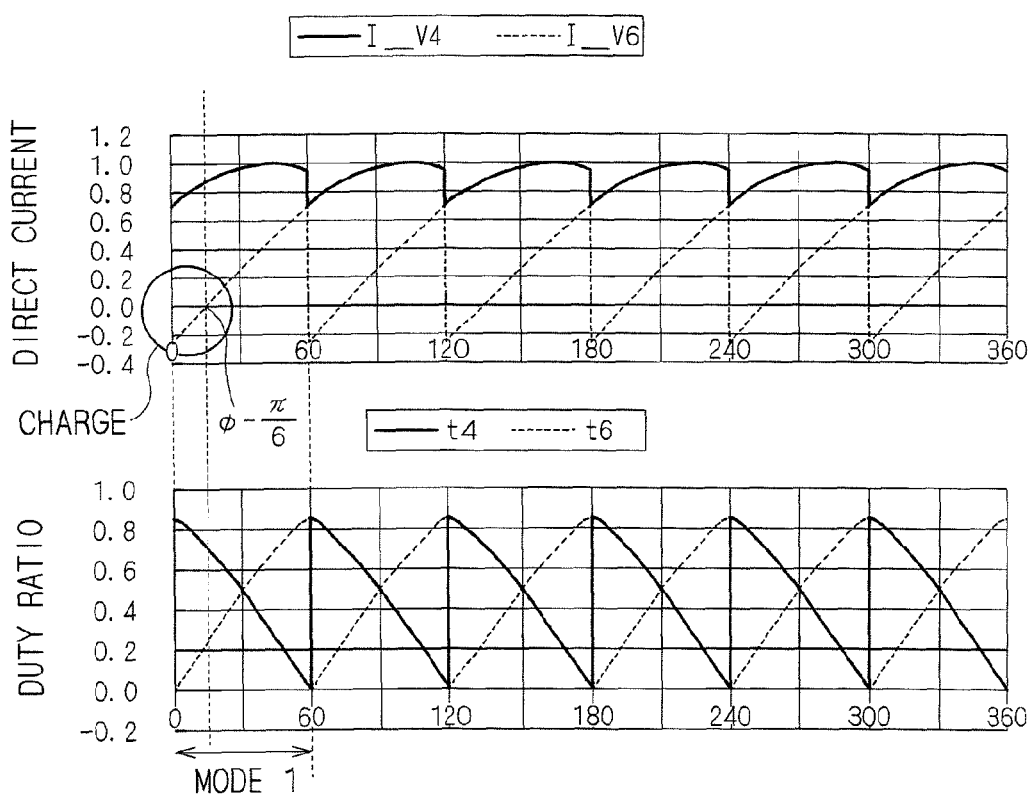
F I G . 1 4

F I G . 1 5
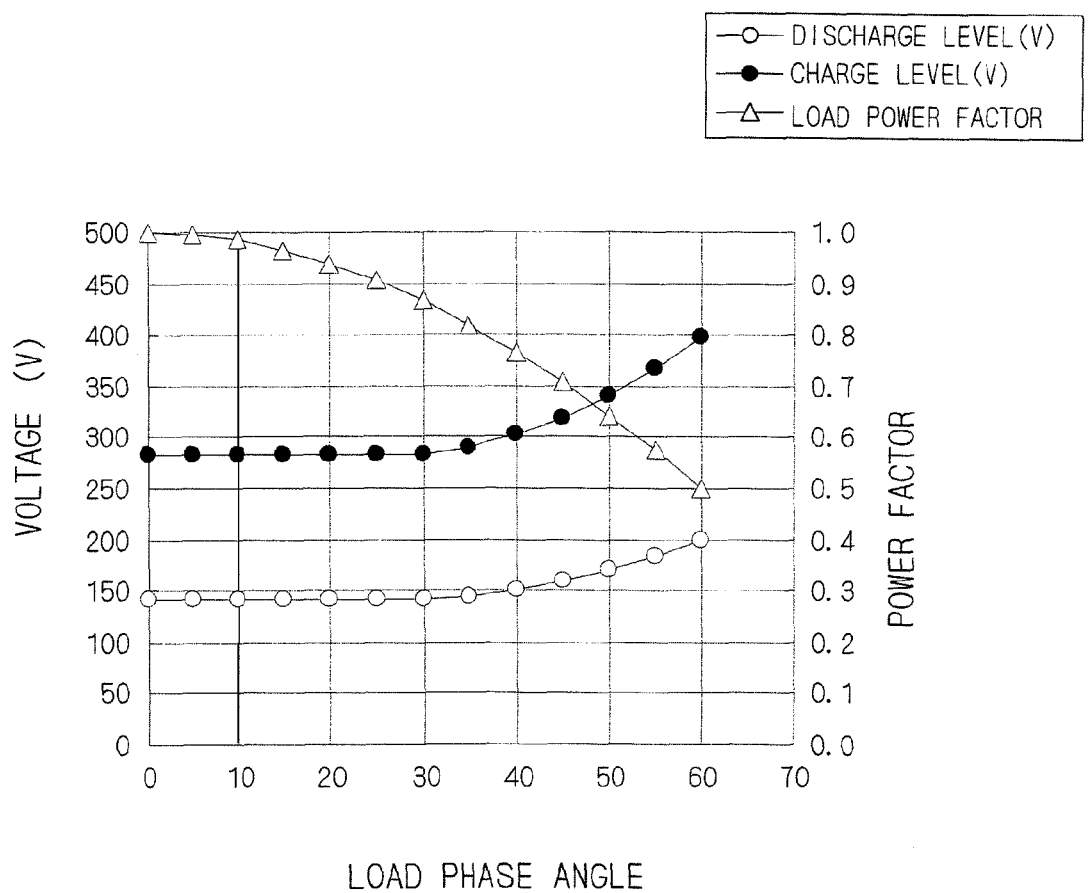

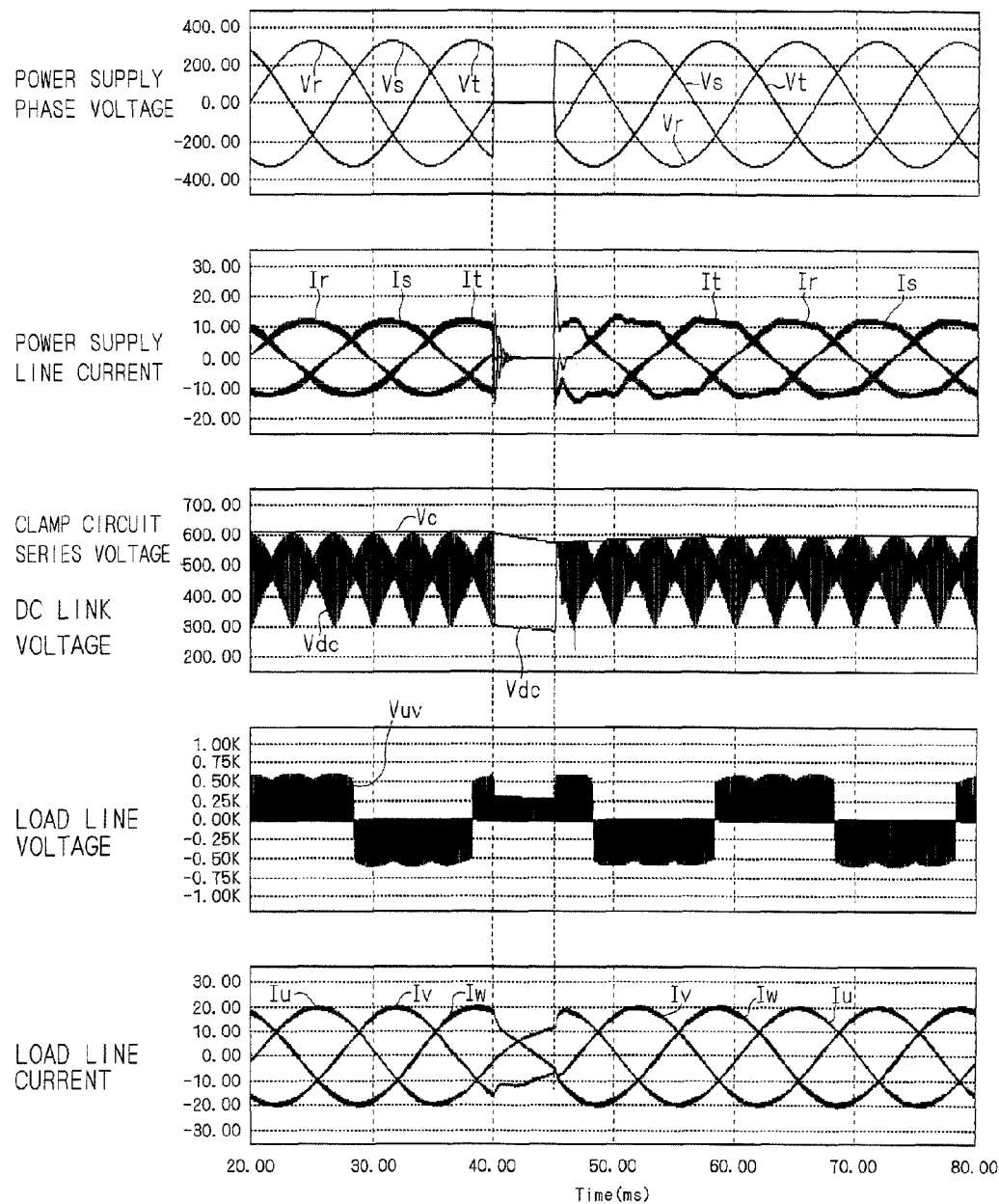
F I G . 1 6

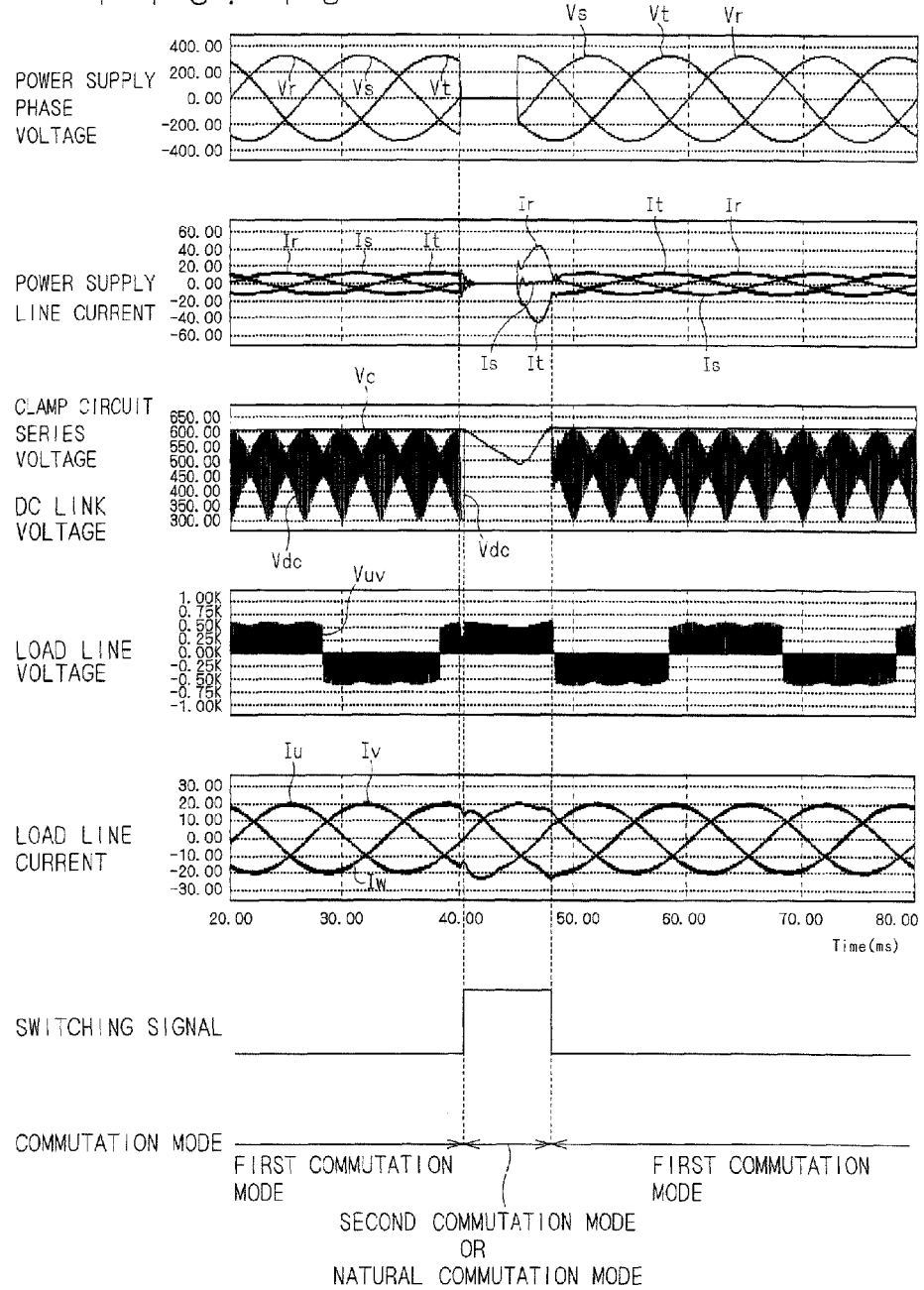

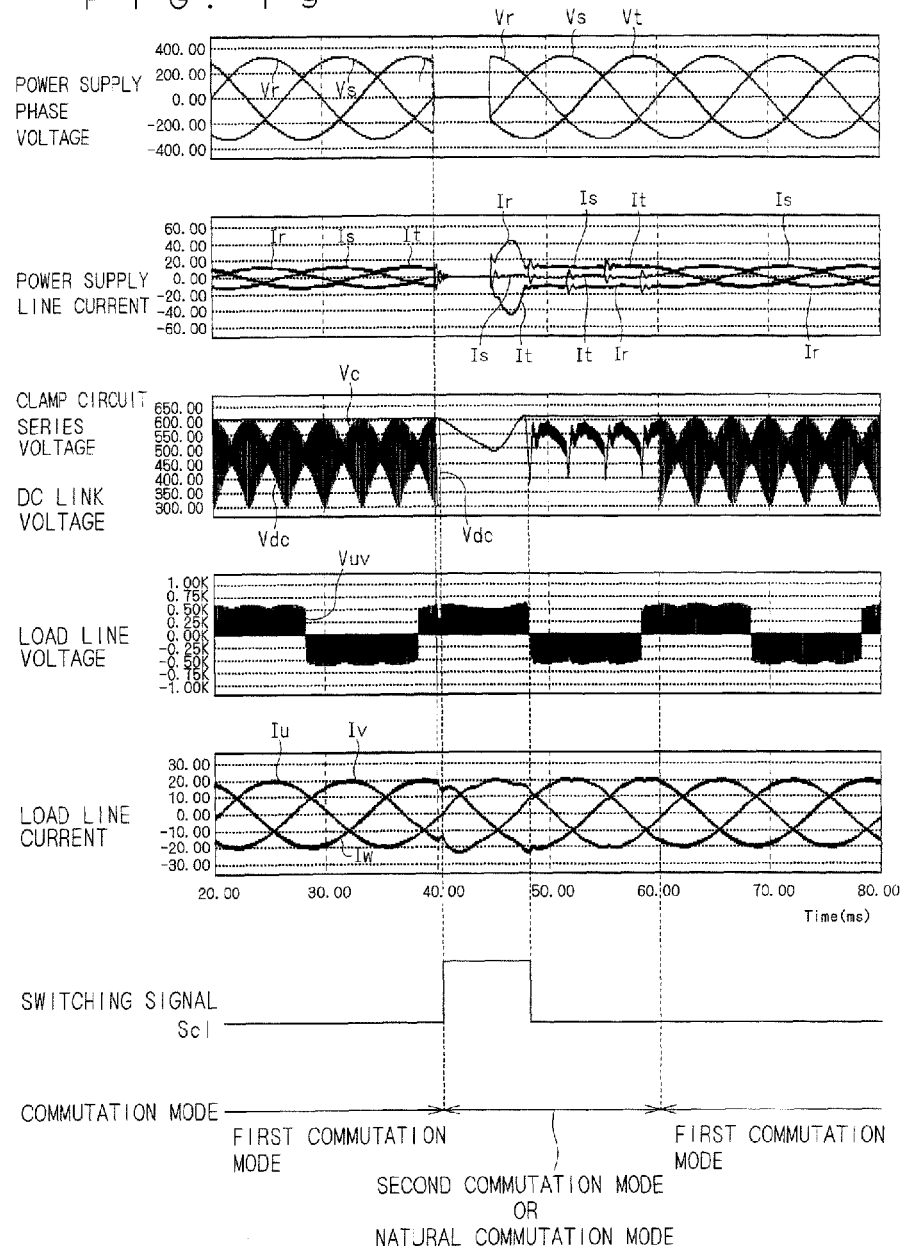

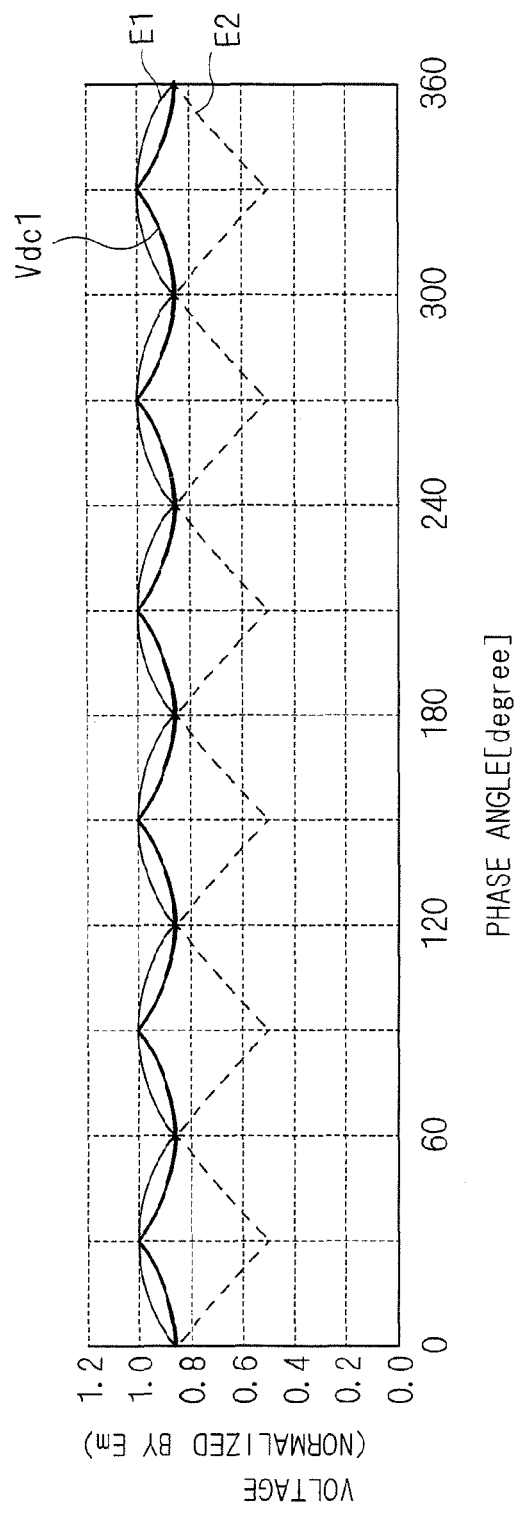

POWER CONVERTING APPARATUS

TECHNICAL FIELD

The present invention relates to a power converting apparatus, and more particularly, to a clamp circuit (including a snubber) direct AC power converting apparatus.

BACKGROUND ART

A so-called indirect AC power converting apparatus is generally used as typical main circuitry of an inverter. In the indirect AC power converting apparatus, AC is rectified and is converted into DC via a smoothing circuit, whereby an AC output is obtained by a voltage-source converter.

On the other hand, as a mode of directly obtaining an AC output from an AC voltage, there is known a direct AC power converting apparatus represented by a matrix converter. The direct AC power converting apparatus does not require a large capacitor for smoothing a voltage ripple due to commercial frequency or a reactor. Accordingly, a direct AC power converting apparatus is expected to be miniaturized, and in recent year, it has been drawing attention as the next generation of a power converting apparatus.

For example, Japanese Patent Application Laid-Open No. 2004-222337, Japanese Patent Application Laid-Open No. 2004-266972, Japanese Patent Application Laid-Open No. 2007-312589 and WO 2007/123118 disclose the technology of directly converting AC to AC without using a smoothing circuit in a DC link. In particular, in Japanese Patent Application Laid-Open No. 2007-312589 and WO 2007/123118, it is aimed to facilitate control of a converter and an inverter by determining the timing at which the converter performs commutation in accordance with the results of comparison between a carrier and three trapezoidal waves that have phases shifted from each other by 120 degrees.

Further, Japanese Patent Application Laid-Open No. 2007-295686 discloses the technology of employing a clamp circuit using a device required to have a small breakdown voltage, to thereby solve a problem of regenerative current in a direct AC power converting apparatus.

Note that Japanese Patent No. 3806872, Japanese Patent Application Laid-Open No. 05-56682 and Japanese Patent No. 2524771 are related to the present application. Japanese Patent No. 3806872 discloses the technology of reducing errors in estimating a rotating position of a motor by causing the current to be supplied to be large and have a lagging phase. Japanese Patent Application Laid-Open No. 05-56682 discloses the technology of handling instantaneous stop/reactivation of a power source in an indirect AC power converting circuit. Japanese Patent No. 2524771 describes power conversion using a diode bridge equivalent to a natural commutation mode of a converter.

Note that as the documents related to the present application, there are further given: Lixiang Wei and Thomas A. Lipo, "A Novel Matrix Converter Topology with Simple Commutation", IEEE IAS 2001, Vol. 3, 2001, pp. 1749-1754 (hereinafter, referred to as "A Novel Matrix Converter Topology with Simple Commutation"); Rie Itoh and Isao Takahashi, "Decoupling Control of Input and Output Reactive Power of the Matrix Converter", IEEJ Technical Meeting on Semiconductor Power Converter, SPC-01-121, 2001 (hereinafter, referred to as "A Novel Matrix Converter Topology with Simple Commutation"); Koji Kato and Jun-ichi Itoh, "Improvement of Waveform for a Boost type AC/DC/AC Direct Converter", Year 2007 IEEJ National Convention 4-098, 2007, pp. 153 and 154; Koji Kato and Jun-ichi Itoh, "Improvement of Waveform for a Boost type AC/DC/AC Direct Converter Focused on Input Current" Year 2007 IEEJ Industry Applied Section Meeting 1-31, pp. 279-282; Takaharu Takeshita, Koji Toyama and Nobuyuki Matsui, "PWM Scheme for Current Source Three-Phase Inverters and Converters", IEEJ Transactions on Industry Applications, Vol. 116, No. 1, 1996, pp. 106 and 107 (hereinafter, referred to as "PWM Scheme for Current Source Three-Phase Inverters and Converters"); and Siyoung Kim, Seung-Ki Sul, Thomas A. Lipo, "AC/AC Power Conversion Based on Matrix Converter Topology with Unidirectional Switches", IEEE trans. on Industry Applications, Vol. 36, No. 1, 2000, pp. 139-145 (hereinafter, referred to as "AC/AC Power Conversion Based on Matrix Converter Topology with Unidirectional Switches").

DISCLOSURE OF INVENTION

Problems to be Solved by the Invention

When the technologies described in Japanese Patent Application Laid-Open No. 2007-312589 and WO 2007/123118 are applied to a direct AC power converting apparatus in which a current-source converter, a DC link and a voltage-source inverter are connected in the stated order, the converter cannot reverse the voltage of the DC link. Accordingly, the regenerative current cannot be handled in a case of a low load power factor, leading to an occurrence of overvoltage in the DC link.

Therefore, as employed in Japanese Patent Application Laid-Open No. 2007-295686, it is conceivable that a clamp circuit including a capacitor could be employed to absorb the regenerative current. More specifically, the charge voltage of a capacitor rises by charging of series connection of two capacitors, and the discharge current from parallel connection of the two capacitors increases, whereby the current is circulated. Accordingly, the clamp voltage is balanced (see FIG. 3 of Japanese Patent Application Laid-Open No. 2007-295686).

It is shown that in this mode, the clamp voltage can be made to be equal to or less than 1.4 times a crest value of a power supply voltage if a load power factor is 0.5 or more (see FIG. 7 of Japanese Patent Application Laid-Open No. 2007-295686), which is sufficiently applicable to a load power factor of a motor in a steady operation.

However, in a case where the position detecting method as described in Japanese Patent No. 3806872 is employed to perform an operation in which a power factor is significantly reduced, the clamp circuit of Japanese Patent Application Laid-Open No. 2007-295686 is not adaptable enough. Besides, in view of the fact that a position is generally detected at activation, there is a possibility that the clamp voltage in a DC link becomes an overvoltage, which makes activation difficult.

Further, in a case where an instantaneous blackout of a power source occurs as descried in Japanese Patent Application Laid-Open No. 05-56682, insufficient clamp voltage may make continuation of the operation difficult. By employing the technologies described in Japanese Patent Application Laid-Open No. 2007-312589 and WO 2007/123118, any one of a potential difference between a maximum phase and a minimum phase and a potential difference between a maximum phase or a minimum phase and a middle phase is applied to a DC link in a case where a power supply voltage is supplied normally to a converter. However, those potential differences are reduced when an instantaneous blackout occurs, which reduces the clamp voltage. This trend becomes conspicuous when two capacitors are connected in parallel when a discharge current flows from the clamp circuit.

Therefore, an object of the invention according to the present application is to make absorption of a regenerative current and direct AC power conversion compatible with each other in a power converting apparatus.

Means to Solve the Problems

A power converting apparatus according to the present invention includes: three input ends (Pr, Ps, Pt) respectively receiving a phase voltage of three-phase AC; three output ends (Pu, Pv, Pw); first and second DC power supply lines (LH, LL); a current-source converter (4) including a first switching device group including three switching devices (Qrp, Qsp, Qtp) connected between each of the input ends and the first DC power supply line and three switching devices (Qrn, Qsn, Qtn) connected between each of the input ends and the second DC power supply line; a voltage-source inverter (6) including a second switching device group including three switching devices (Qup, Qvp, Qwp) connected between each of the output ends and the first DC power supply line and three switching devices (Qun, Qvn, Qwn) connected between each of the output ends and the second DC power supply line; and a clamp circuit (5) including a clamp diode (Dcl), a capacitor (51; 52; 51, 52) and a shorting switch (Qcl), the clamp diode having an anode and a cathode connected to the first and second DC power supply lines, respectively, the capacitor being connected in series with the clamp diode between the first and second DC power supply lines, the shorting switch being connected in parallel with the clamp diode.

Further, in a first aspect thereof, the converter performs commutation in accordance with any of a first commutation mode and a 120-degree conduction mode determined by the results of comparison between a carrier and three trapezoidal waves having a 360-degree cycle and a phase different from each other by 120 degrees. In the first commutation mode, each of the trapezoidal waves has a pair of flat sections continuous for a 120-degree section and a pair of slope areas linking the pair of flat sections for a 60-degree section. The converter performs commutation by comparison between the carrier and the trapezoidal waves changing between the pair of flat sections in the first commutation mode. The 120-degree conduction mode is employed at the timing when the shorting switch is conductive in a state in which the first commutation mode is employed, and the first commutation mode is employed at and after the time when the shorting switching is rendered non-conductive.

According to a second aspect of the power converting apparatus of the present invention, in the first aspect, the shorting switch is rendered conductive when a power factor of a load (7) connected to the output ends falls below a predetermined value.

According to a third aspect of the power converting apparatus of the present invention, in the second aspect, the load (7) is a rotary machine; and the converter (4) performs commutation in accordance with the 120-degree conduction mode during a predetermined period at the beginning of activation.

According to a fourth aspect of the power converting apparatus of the present invention, in the first aspect, the shorting switch is rendered conductive when a DC voltage between the first and second DC power supply lines (LH, LL) keeps to be a first threshold value or less for a predetermined period. Alternatively, the shorting switch is rendered conductive when an average value is equal to or less than a first threshold value, the average value being obtained by averaging a DC voltage between the first and second DC power supply lines (LH, LL) within one cycle of the carrier.

In the fourth aspect of the power converting apparatus, for example, the shorting switch is rendered non-conductive when the DC voltage between the first and second DC power supply lines (LH, LL) keeps a value exceeding a second threshold value equal to or more than the first threshold value for a predetermined period; and the first commutation mode is employed at the timing when the shorting switch is rendered non-conductive.

Alternatively, in the fourth aspect of the power converting apparatus, for example, the shorting switch is rendered non-conductive at the timing when the DC voltage between the first and second DC power supply lines (LH, LL) exceeds a second threshold value equal to or more than the first threshold value.

Preferably, the first commutation mode is employed at the timing when the shorting switch is rendered non-conductive. Alternatively, the first commutation mode is employed after a lapse of a predetermined period from non-conduction of the shorting switch.

According to a fifth aspect of the power converting apparatus of the present invention, in any one of the first to fourth aspects: in the clamp circuit (5): the capacitor is divided into a first capacitor (51) and a second capacitor (52) connected in series with each other; and the anode of the clamp diode (Dcl) is connected to the first DC power supply line (LH) via the first capacitor, and the cathode thereof is connected to the second DC power supply line (LL) via the second capacitor; and the clamp circuit further includes: a first diode (53) having an anode connected to the cathode of the clamp diode and a cathode connected to the first DC power supply line; and a second diode (54) having a cathode connected to the anode of the clamp diode and an anode connected to the second DC power supply line.

According to a sixth aspect of the power converting apparatus of the present invention, in any one of the first to fifth aspects: the 120-degree conduction mode is a second commutation mode; each of the trapezoidal waves has a pair of flat sections continuous for a 180-degree section in the second commutation mode; and in the second commutation mode, the converter performs commutation by comparison between the carrier and the trapezoidal waves changing between the pair of flat sections.

According to a seventh aspect of the power converting apparatus of the present invention, in any one of the first to fifth aspects, the 120-degree conduction mode is a natural commutation mode in which the first switching device group is all conductive.

Effects of the Invention

According to the first aspect of the power converting apparatus of the present invention, the commutation mode of the converter can be appropriately changed and absorption of a regenerative current and direct AC power conversion can make compatible with each other even in a case where the shorting switch is rendered conductive to stop an essential function of the clamp circuit for dealing with a reduction in power factor of the load connected to the output ends and an instantaneous voltage reduction of the power supply connected to the input ends, or in a case where the shorting switch is not rendered conductive to cause the clamp circuit to exhibit its essential function.

According to the second aspect of the power converting apparatus of the present invention, a malfunction of the first commutation mode, which results from the regenerative current that increases as the power factor decreases, is avoided.

According to the third aspect of the power converting apparatus of the present invention, a measure is taken against a reduction in power factor resulting from the current having a lagging phase for detecting a position of a rotary machine at the beginning of activation.

According to the fourth aspect of the power converting apparatus of the present invention, a malfunction of the first commutation mode, which results from a reduction in DC voltage, is avoided.

According to the fifth aspect of the power converting apparatus of the present invention, when the shorting switch is non-conductive, the first and second capacitors are charged through a path in which they are connected in series and the first and second capacitors are discharged through a path in which they are connected in parallel, whereby a small breakdown voltage suffices for the first and second capacitors. When the shorting switch is conducive, the first and second capacitors are charged/discharged through the path in which they are connected in series, and the function as the clamp circuit is stopped.

According to the sixth aspect of the power converting apparatus of the present invention, the converter performs commutation by comparison between the trapezoidal waves and a carrier in both of the first and second commutation modes, and thus design is not required to be individually made correspondingly to those commutation modes.

According to the seventh aspect of the power converting apparatus of the present invention, it is not required to compare the trapezoidal waves with a carrier in the 120-degree conduction mode.

These and other objects, features, aspects and advantages of the present invention will become more apparent from the following detailed description of the present invention when taken in conjunction with the accompanying drawings.

BRIEF DESCRIPTION OF DRAWINGS

FIG. 5 is a graph describing operations of a converter and an inverter in the first commutation mode;

FIG. 10 is another graph describing operations of the converter and the inverter in the second commutation mode;

FIG. 12 is a circuit diagram showing a configuration of a virtual inverter;

FIG. 13 is a graph showing the relationship between a clamp voltage supported by a clamp circuit and a load power factor;

FIG. 14 is a figure showing FIG. 6(d) and (e) of Japanese Patent Application Laid-Open No. 2007-295686;

FIG. 15 is another graph showing the relationship between the clamp voltage supported by the clamp circuit and the load power factor;

FIG. 16 is a graph showing an operation when the clamp circuit functions even during an instantaneous blackout;

FIG. 18 is another graph showing an operation of switching the commutation modes of the converter;

FIG. 19 is a graph showing an operation of switching the commutation modes of the converter; and FIG. 20 is a graph showing a DC link voltage and an average value thereof.

BEST MODE FOR CARRYING OUT THE INVENTION

Figure 1:
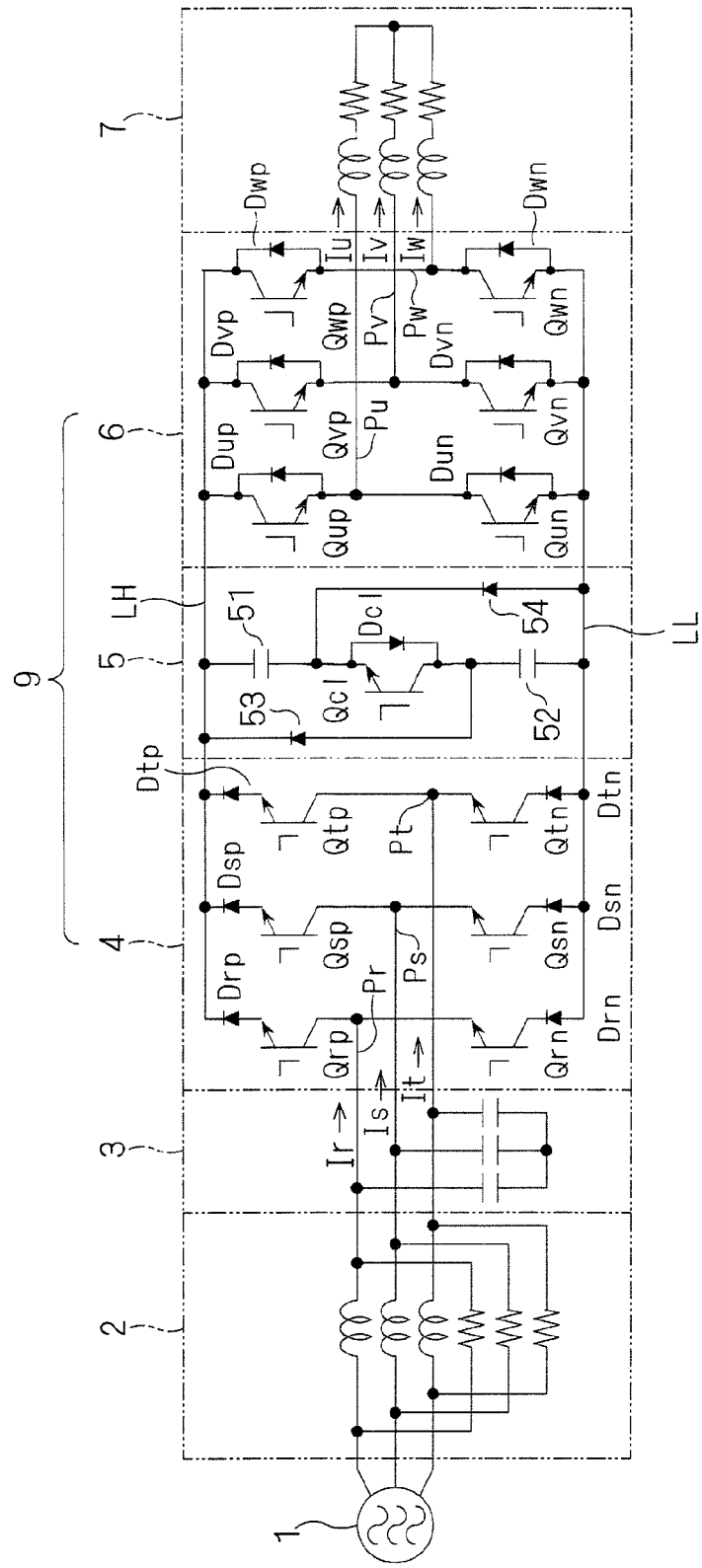
FIG. 1 is a circuit diagram illustrating a configuration of a direct power converting apparatus according to the present application.

FIG. 1 is a circuit diagram illustrating a configuration of a direct power converting apparatus 9 according to the present application. The direct power converting apparatus 9 includes a converter 4, a clamp circuit 5 and an inverter 6 connected in this order.

The direct power converting apparatus 9 includes three input ends Pr, Ps and Pt that receive line voltages of three-phase AC from a power source 1 and three output ends Pu, Pv and Pw connected with a load 7. The direct power converting apparatus 9 also includes DC power supply lines LH and LL that become a DC link. The function of the converter 4 causes the DC power supply line LH to have a higher potential than that of the DC power supply line LL.

The converter 4 includes six switching devices Qrp, Qsp, Qtp, Qrn, Qsn and Qtn. Those are also referred to as a first switching device group for the sake of description. The switching devices Qrp, Qsp and Qtp are connected between the DC power supply line LH and the input ends Pr, Ps and Pt, respectively, and the switching devices Qrn, Qsn and Qtn are connected between the DC power supply line LL and the input ends Pr, Ps and Pt, respectively. The converter 4 constitutes a so-called current-source converter and includes six diodes Drp, Dsp, Dtp, Drn, Dsn and Dtn. Those are also referred to as a first diode group for the sake of description. Cathodes of the diodes Drp, Dsp, Dtp, Drn, Dsn and Dtn are arranged on the DC power supply line LH side and anodes thereof are arranged on the DC power supply line LL side. The diode Drp is connected in series with the switching device Qrp between the input end Pr and the DC power supply line LH. Similarly, the diodes Dsp, Dtp, Drn, Dsn and Dtn are connected in series with the switching devices Qsp, Qtp, Qrn, Qsn and Qtn, respectively.

The inverter 6 includes six switching devices Qup, Qvp, Qwp, Qun, Qvn and Qwn. Those are also referred to as a second switching device group for the sake of description. The switching devices Qup, Qvp and Qwp are connected between the DC power supply line LH and the output ends Pu, Pv and Pw, respectively, and the switching devices Qun, Qvn and Qwn are connected between the DC power supply line LL and the output ends Pu, Pv and Pw, respectively. The inverter 6 constitutes a so-called voltage-source inverter and includes six diodes Dup, Dvp, Dwp, Dun, Dvn and Dwn. Those are also referred to as a second diode group for the sake of description.

Cathodes of the diodes Dup, Dvp, Dwp, Dun, Dvn and Dwn are arranged on the DC power supply line LH side, and anodes thereof are arranged on the DC power supply line LL side. The diode Dup is connected in parallel with the switching device Qup between the output end Pu and the DC power supply line LH. Similarly, the diodes Dvp, Dwp, Dun, Dvn and Dwn are connected in parallel with the switching devices Qvp, Qwp, Qun, Qvn and Qwn, respectively.

In the clamp circuit 5, a clamp diode Dcl and capacitors 51 and 52 are connected between the DC power supply lines LH and LL. Specifically, an anode and a cathode of the clamp diode Dcl are connected to the DC power supply line LH side and the DC power supply line LL side via the capacitors 51 and 52, respectively. A shorting switch Qcl is connected in parallel with the clamp diode Dcl.

Note that diodes 53 and 54 may be provided such that the capacitors 51 and 52 are connected in parallel during discharging. Specifically, an anode and a cathode of the diode 53 are connected to the cathode of the clamp diode Dcl and the DC power supply line LH, respectively. In addition, an anode and a cathode of the diode 54 are connected to the DC power supply line LL and the anode of the clamp diode Dcl, respectively.

When the shorting switch Qcl is non-conductive, the capacitors 51 and 52 are charged through a path in which both are connected in series and discharged through a path in which both are connected in parallel, with the result that small breakdown voltage suffices for those capacitors (see Japanese Patent Application Laid-Open No. 2007-295686). When the shorting switch is conductive, the capacitors 51 and 52 are charged/discharged through the path in which both are connected in series, and an essential function of the clamp circuit 5 is stopped.

For example, IGBTs (insulated gate bipolar transistors) are employed for the respective switching devices of the first switching device group and the second switching device group and the shorting switch Qcl.

Note that in a case where the diodes 53 and 54 are not provided, the clamp circuit 5 has the configuration as a so-called CD snubber by the clamp diode Dcl and the capacitors 51 and 52 if series connection between the capacitors 51 and 52 is grouped together. In the present application, the above-mentioned CD snubber is grasped to be included in the clamp circuit (see "Technical Field" of the present specification).

A reactor group 2 and a capacitor group 3 are interposed between the power source 1 and the input ends Pr, Ps and Pt. Although resistors are respectively connected in parallel with reactors constituting the reactor group 2, those resistors can be omitted. The functions of the reactor group 2 and the capacitor group 3 are well known and have little direct relevance to the invention according to the present embodiment, and hence the description of the reactor group 2 and the capacitor group 3 is omitted in the present embodiment.

The load 7 is, for example, a rotary machine, and is shown by an equivalent circuit indicating an inductive load.

The converter 4 performs commutation in accordance with a first commutation mode, a second commutation mode and a natural commutation mode described below in detail.

In both of the first commutation mode and the second commutation mode, the timing for commutation is determined in accordance with results of comparison between a carrier and three trapezoidal waves which have a 360-degree cycle and whose phases are shifted from each other by 120 degrees. Each of the trapezoidal waves in the first commutation mode has a pair of flat sections that continue for a 120-degree section and a pair of slope areas for a 60-degree section that link the pair of flat sections.

In the second commutation mode, each of the trapezoidal waves has a pair of flat sections that continue for 180 degrees, and substantially is a rectangular wave. Typically, the concept of "trapezoidal" includes "rectangular", and thus in the present embodiment, a rectangular wave used in the second commutation mode in comparison with a carrier is also referred to as a trapezoidal wave, similarly to the trapezoidal wave compared with a carrier in the first commutation mode.

In both of the first commutation mode and the second commutation mode, commutation is performed by the comparison between a carrier and trapezoidal waves that change between a pair of flat sections.

(First Communication Mode)

Figure 2:
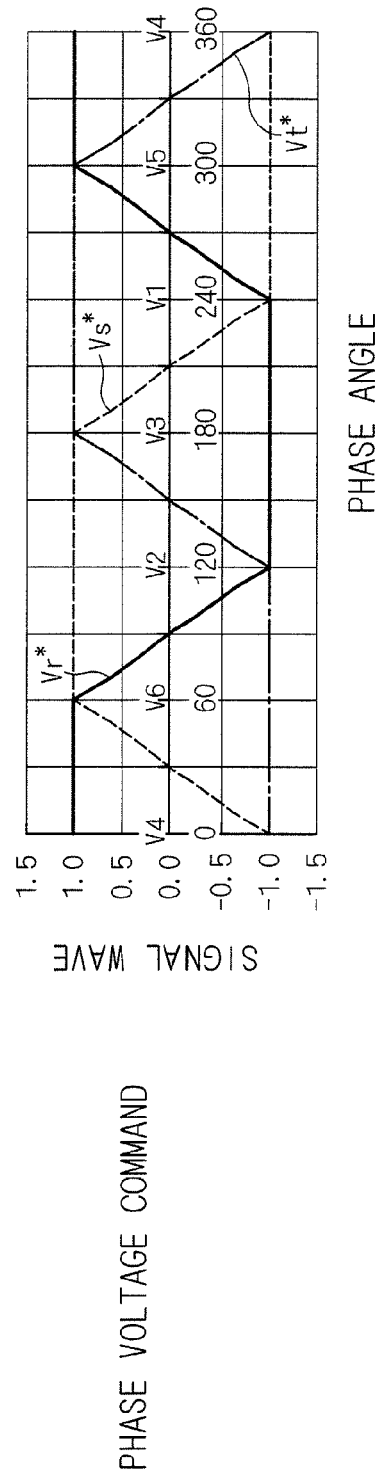
FIG. 2 is a graph illustrating trapezoidal waves employed in a first commutation mode.

The first commutation mode is the commutation technology already disclosed in Japanese Patent Application Laid-Open No. 2007-312589 and WO 2007/123118. The converter 4 performs commutation based on results of comparison between the carrier and the trapezoidal waves of the slope area in the 60-degree section. FIG. 2 is a graph illustrating the trapezoidal waves. A horizontal axis shows a phase angle for 360 degrees. In the graph, each of the areas of substantially triangular shapes in which phase voltage vectors V4, V6, V2, V3, V1 and V5 are shown indicates a ratio of a patterns of switching corresponding to the shown phase voltage Vector. That is, only switching corresponding to the phase voltage vector V4 is performed at the phase angle of 0 degrees, switching corresponding to the phase voltage vector V4 and switching corresponding to the phase voltage vector V6 are performed at a ratio 1:1 at the phase angle of 30 degrees, and only switching corresponding to the phase voltage vector V6 is performed at the phase angle of 60 degrees.

Note that each digit of a three-digit number obtained by converting the number added to a phase voltage vector into a binary number indicates a conduction/non-conduction state for each phase of the switching device group in a virtual voltage-source converter. For example, the phase voltage vector V4 indicates a pattern in which the virtual converter respectively provides an r-phase voltage of a power source to the DC power supply line LH and an s-phase voltage and a t-phase voltage to the DC power supply line LL.

As described in Japanese Patent Application Laid-Open No. 2007-312589 and WO 2007/123118, a comparison between a command value of a current-source converter and the carrier can be performed based on the comparison between a carrier and phase voltage commands Vr*, Vs* and Vt* of the virtual voltage-source converter from the duality of current and voltage. As described above, of the trapezoidal wave, it is the slope area in the 60-degree section that is compared with the carrier. Therefore, it suffices that, as an object to be compared with the carrier, one corresponding to a so-called middle phase, which does not take a maximum value and a minimum value, is extracted from the phase voltage commands Vr*, Vs* and Vt*.

Figure 3:
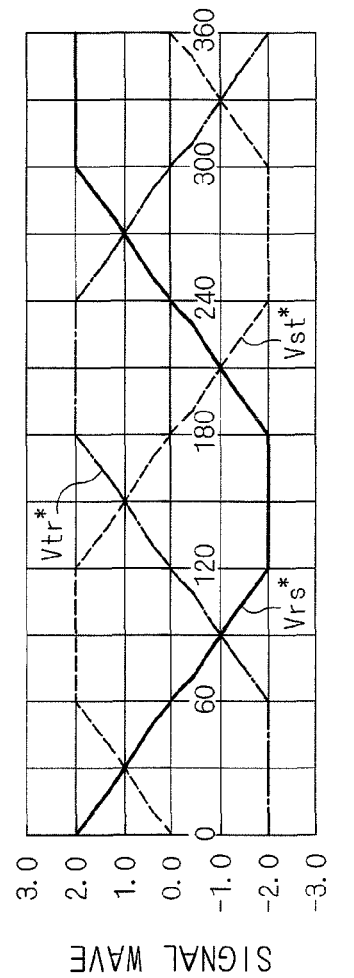
FIG. 3 is a graph illustrating line voltage commands in the first commutation mode.

More specifically, line voltage commands Vrs*, Vst* and Vtr* obtained from those phase voltage commands Vr*, Vs* and Vt* are equivalent to line current commands of a current-source converter (for example, see "A Novel Matrix Converter Topology with Simple Commutation"). Therefore, command values of the current-source converter can be obtained from the phase voltage commands Vr*, Vs* and Vt* by applying a logical operation based on "PWM Scheme for Current Source Three-Phase Inverters and Converters". FIG. 3 is a graph showing the line voltage commands Vrs*, Vst* and Vtr*.

As described in "A Novel Matrix Converter Topology with Simple Commutation" and Japanese Patent Application Laid-Open No. 2007-312589 and WO 2007/123118, while a line current substantially has a sinusoidal waveform by commutation of the converter in the first commutation mode, an average value of the DC link voltage has ripples. Specifically, the average value takes a maximum value at the center of each 60-degree section, and a value of $\sqrt{3}/2$ of the maximum value is provided as the smallest value at both ends of the section. Note that in "A Novel Matrix Converter Topology with Simple Commutation" and Japanese Patent Application Laid-Open No. 2007-312589 and WO 2007/123118, an amplitude of a voltage with ripples is 3/2 of the phase voltage, and thus the smallest value is $\sqrt{3}/2$ of the maximum value based on the DC link voltage to which a line voltage of three-phase voltage is applied.

FIG. 20 is a graph showing envelopes E1 and E2 of a DC link voltage Vdc and an average value Vdc1 of the DC link voltage Vdc. The envelopes E1 and E2 are equivalent to a difference between a maximum phase voltage and a minimum phase voltage and a difference between a middle phase voltage and the minimum phase voltage, respectively. The average value Vdc1 is a value obtained by removing fluctuations due to pulse width modulation from the DC link voltage Vdc. The DC link voltage Vdc changes between the envelopes E1 and E2 by switching of the converter 4, which is omitted. The average value Vdc1 is represented by ($\sqrt{3}/2$)Em/Vm (see "A Novel Matrix Converter Topology with Simple Commutation" and Japanese Patent Application Laid-Open No. 2007-312589 and WO 2007/123118 for detailed derivation). Here, Em represents a maximum value of a difference between the maximum phase voltage and the minimum phase voltage, and Vm represents an absolute value of the maximum phase voltage. The average value Vdc1 is a value obtained by averaging the DC link voltage Vdc in one cycle of a carrier of the converter.

Figure 4:
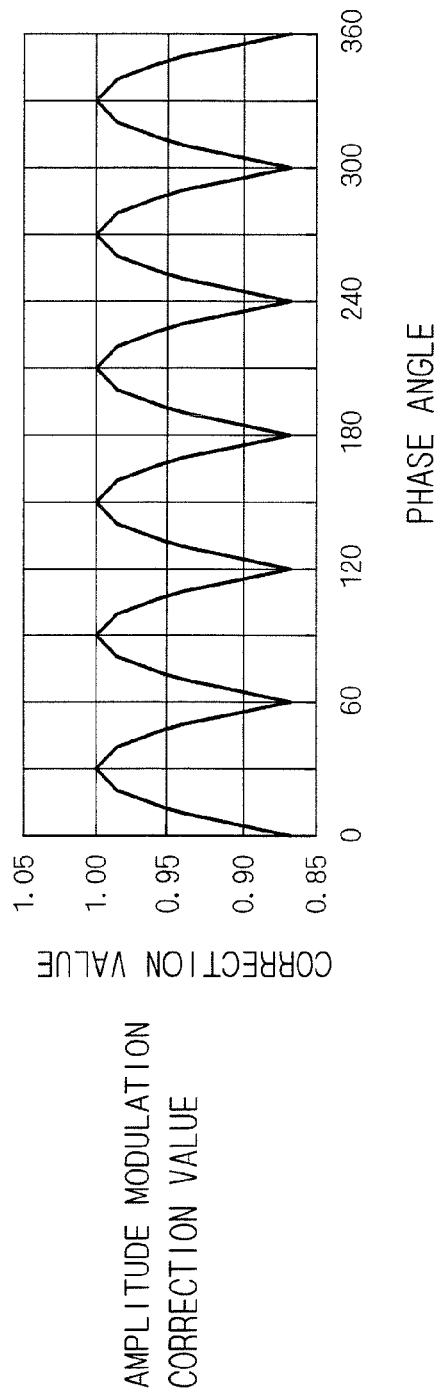
FIG. 4 is a graph illustrating a correction value for performing amplitude modulation correction in the first commutation mode.

In order to achieve three-phase equilibrium by correcting the pulsation of the average value Vcd1, it is desired to perform amplitude modulation correction on a line voltage command. FIG. 4 is a graph illustrating a correction value for performing the above-mentioned amplitude modulation correction. Such correction is described in, for example, "A Novel Matrix Converter Topology with Simple Commutation".

Here, consideration is made on the state in which the switching devices Qtp, Qrn and Qsn are non-conductive and the switching devices Qrp and Qsp are conductive in a complementary manner while the switching device Qtn is conductive in the converter 4. The ratio between the period in which the switching device Qrp is conductive and the period in which the switching device Qsp is conductive is equal to the ratio between a value of a line voltage command Vrs* and a value of a line voltage command Vst* of FIG. 3. Therefore, description is further given considering that the ratio between the period in which the switching device Qrp is conductive and the period in which the switching device Qsp is conductive is drt:dst.

FIG. 5 is a graph describing operations of the converter 4 and the inverter 6 in the first commutation mode. Here, a triangular wave (which may be a sawtooth wave) whose value fluctuates from zero to drt+dst and which has a cycle ts is employed as a carrier C used in commutation of the converter 4. Control is made such that the switching device Qrp is rendered conductive when the carrier C takes a value of zero to drt and the switching device Qsp is rendered conductive when the carrier C takes a value of drt to drt+dst, whereby the ratio between the period in which the switching device Qrp is conductive and the period in which the switching device Qsp is conductive can be made drt:dst.

Input currents Ir, Is and It show currents flowing into the input ends Pr and Ps and the current flowing out of the input end Pt, respectively. Further, a DC link current Idc is the current flowing through the DC link section and, in this case, is the current flowing through the DC power supply lines LH and LL when the current flowing through the clamp circuit 5 is not taken into consideration.

The carrier C used in commutation on the inverter 6 is also used as the carrier C used in commutation of the converter 4. FIG. 5 illustrates a case where the voltage vectors V0, V4 and V6 are repeatedly employed in commutation of the inverter 6. Note that there is no direct relevance between the voltage vectors (FIG. 5) of the inverter 6 and the virtual phase voltage vectors (FIG. 2) employed in commutation of the converter 4. Each digit of a three-digit number obtained by converting the number added to a phase voltage vector employed in commutation of the inverter 6 into a binary number indicates conduction/non-conduction for each phase of the second switching device group. For example, the voltage vector V4 indicates a pattern in which the inverter 6 connects the DC power supply line LH to the output end Pu and connects the DC power supply line LL to the output ends Pv and Pw.

In this case, as described in Japanese Patent Application Laid-Open No. 2007-312589 and WO 2007/123118, when the ratios of the periods in which the voltage vectors V0, V4 and V6 are employed are indicated by d0, d4 and d6 (note that d6=1−d0−d4), respectively, it suffices that the voltage vector V0 is employed during a period in which the carrier C takes a value drt(1−d0) to drt+dst·d0, the voltage vector V4 is employed during a period in which the carrier C takes a value drt+dst·d0 to drt+dst(d0+d4) and a period of taking a value drt(1−d0−d4) to drt(1−d0), and the voltage vector V6 is employed during a period in which the carrier C takes a value 0 to drt(1−d0−d4) and a period of taking a value drt+dst(d0+d4) to drt+dst.

In other words, the conduction pattern of the second switching device group may be switched at the timing when the carrier C takes values drt(1−d0−d4), drt(1−d0), drt+dst·d0 and drt+dst(d0+d4).

Note that the switching devices Qup, Qvp, Qwp, Qun, Qvn and Qwn are rendered conductive/non-conductive by activation/deactivation (indicated by high potential/low potential in the graph) of switching signals Sup, Svp, Swp, Sun, Svn and Swn of FIG. 5, respectively.

Here, a case where commutation of the inverter 6 is repeated by employing the voltage vectors V0, V4 and V6 is illustrated, and thus the switching device Qwp is always non-conductive and the switching device Qwn is always conductive. Accordingly, the switching signals Swp and Swn are shown as deactivation and activation, respectively.

The second switching devices other than the switching device Qwn are all non-conductive in the period in which the voltage vector V0 is employed, and accordingly the DC link current Idc is zero in that period. Along with this, the input currents Ir, Is and It are zero irrespective of the fact that the converter 4 performs commutation at the time when the carrier C takes the value drt.

(Second Commutation Mode)

A trapezoidal wave compared with the carrier in the second commutation mode is substantially a rectangular wave, and thus the period in which the trapezoidal wave changes between a pair of flat sections is extremely short.

Figure 6:
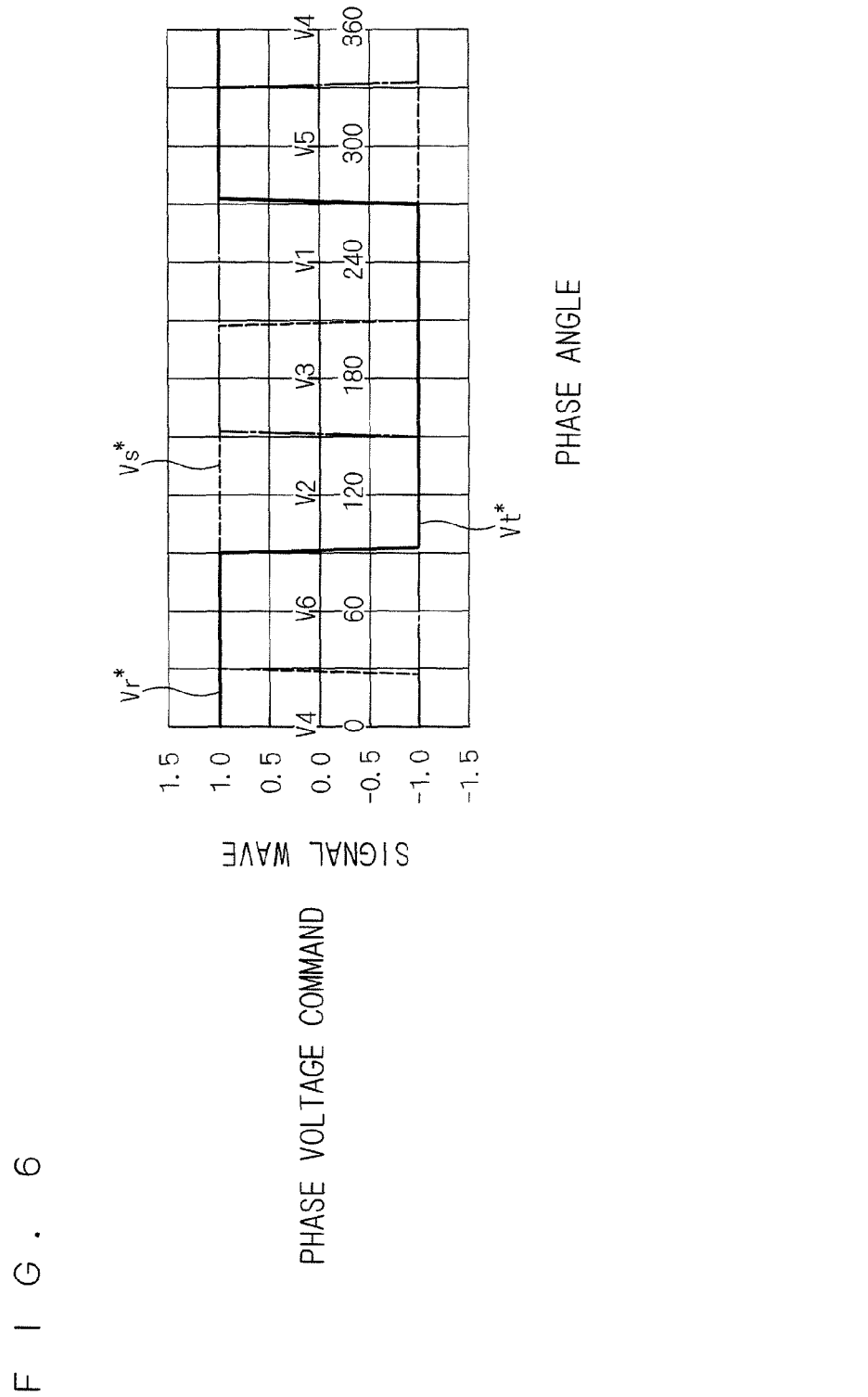
FIG. 6 is a graph illustrating trapezoidal waves employed in a second commutation mode.

FIG. 6 is a graph illustrating trapezoidal waves. In FIG. 6, a horizontal axis is taken as in FIG. 2, where the phase voltage vectors V4, V6, V2, V3, V1 and V5 are shown. Only switching corresponding to the phase voltage vector V4 is performed at the phase angle of 0 to 30 degrees, and only switching corresponding to the phase voltage vector V6 is performed at the phase angle of 30 to 90 degrees.

Figure 7:
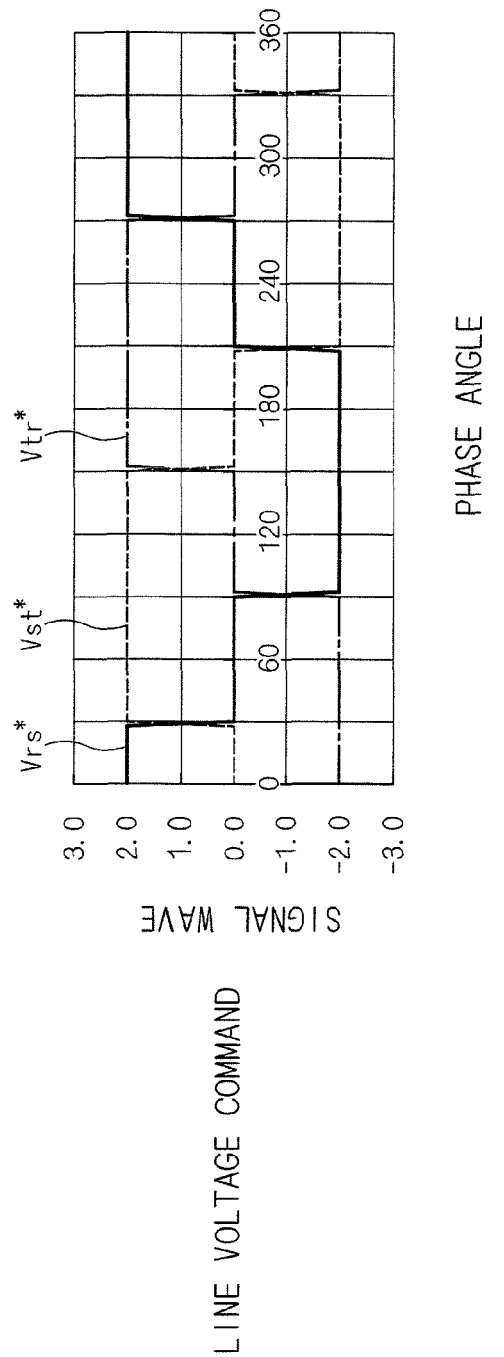
FIG. 7 is a graph showing line voltage commands in the second commutation mode.

Accordingly, values employed at the phase angle of 0 to 30 degrees as the line voltage commands Vrs*, Vst* and Vtr* obtained from the phase voltage commands Vr*, Vs* and Vt* in the second commutation node are values employed at the phase angle of 0 degrees in FIG. 3. Further, the value employed at the phase angle of 30 to 90 degrees is the value employed at the phase angle of 60 degrees in FIG. 3. In this manner, the line voltage commands Vrs*, Vst* and Vtr* have rectangular waves as shown in the graph of FIG. 7.

Therefore, the value compared with the carrier by the current-source converter is dst=0 at the phase angle of 0 to 30 degrees and drt=0 at the phase angle of 30 to 90 degrees.

Figure 8:
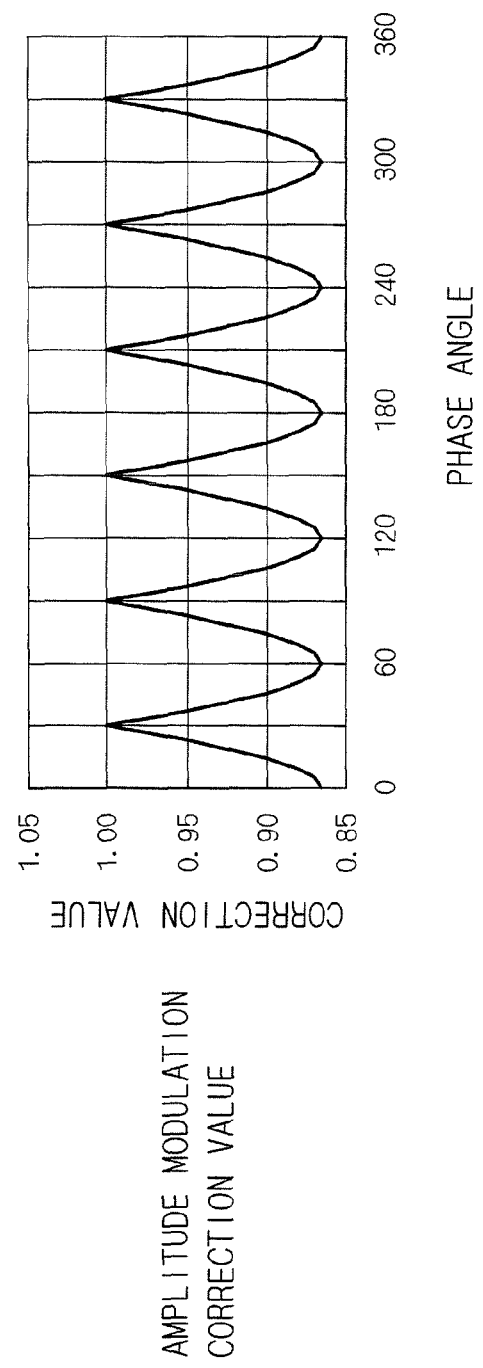
FIG. 8 is a graph illustrating a correction value for performing amplitude modulation correction in the second commutation mode.

Note that though detailed description is omitted, the phase voltage of the middle phase is not applied to the DC link in the second commutation mode, and thus ripple of an average value of the DC link voltage becomes the ripple of a difference between a maximum phase voltage and a minimum phase voltage. Therefore, this ripple has peaks and valleys of a waveform that are opposite to those of the first commutation mode. Further, three-phase equilibrium is achieved by correction of an amplitude thereof, and thus it is desired to perform amplitude modulation correction on the line voltage command. FIG. 8 is a graph illustrating a correction value for performing such amplitude modulation correction. Such correction is illustrated in, for example, Japanese Patent No. 2524771.

Figure 9:
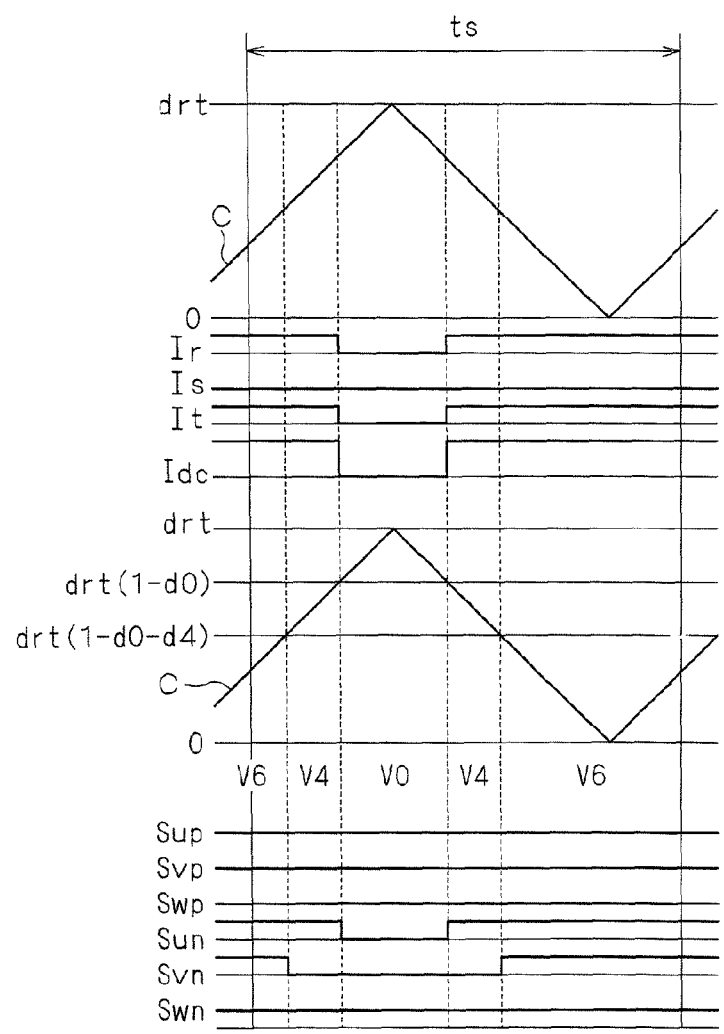
FIG. 9 is a graph describing operations of a converter and an inverter in the second commutation mode.

FIG. 9 and FIG. 10 are graphs describing the operations of the converter 4 and the inverter 6 in the second commutation mode. FIG. 9 and FIG. 10 show the operations of 0 to 30 degrees and the operations at the phase angle of 30 to 90 degrees, respectively, when converted into the phase angles shown in FIG. 6 to FIG. 8.

As described above, the value compared with the carrier C by the converter 4 at the phase angle of 0 to 30 degrees is dst=0, and thus a maximum value of the carrier C is represented as drt. In addition, the value compared with the carrier C by the converter 4 at the phase angle of 30 to 90 degrees is drt=0, and thus a maximum value of the carrier C is represented as dst. That is, the value drt is employed as a command value by the converter 4 at the phase angle of 0 to 90 degrees in common, which results in that the comparison between the carrier C and the value drt is not required in commutation of the converter 4 so that the input currents Ir=It and Is=0 at the phase angle of 0 to 30 degrees and the input currents Is=It and Ir=0 at the phase angle of 30 to 90 degrees.

Therefore, in the commutation of the inverter 6 at the phase angle of 0 to 30 degrees (FIG. 9), dst=0 in the comparison of the voltage-source inverter in the first commutation mode (see FIG. 5), it suffices that the voltage vector V0 is employed during the period in which the carrier C takes the value drt(1−d0) to drt, the voltage vector V4 is employed during the period in which the carrier C takes the value drt(1−d0−d4) to drt(1−d0), and the voltage vector V6 is employed during the period in which the carrier C takes the value 0 to drt(1−d0−d4).

In other words, the conduction pattern of the second switching device may be switched at the timing when the carrier C takes the values drt(1−d0−d4) and drt(1−d0).

In a similar manner, in the commutation of the inverter 6 side at the phase angle of 30 to 90 degrees (FIG. 10), drt=0 in the comparison of the voltage-source inverter in the first commutation mode (see FIG. 5), it suffices that the voltage V0 is employed during the period in which the carrier C takes the value 0 to dst·d0, the voltage vector V4 is employed during the period in which the carrier C takes the value dst·d0 to dst(d0+d4), and the voltage vector V6 is employed during the period in which the carrier C takes the value dst(d0+d4) to dst.

In other words, the conduction pattern of the second switching device may be switched at the timing when the carrier C takes the values dst·d0 and dst(d0+d4).

The case where the voltage vector V0 is employed is illustrated here as in the first commutation mode, and thus the DC link current Idc is zero during the period in which the voltage vector V0 is employed. Along with this, the input currents Ir, Is and It are zero independently of commutation of the converter 4.

In addition, the case where commutation of the inverter 6 is repeated by employing the voltage vectors V0, V4 and V6 is illustrated, and thus in FIG. 9, the switching devices Qup, Qvp and Qwp are always non-conductive and the switching device Qwn is always conductive. Accordingly, the switching signals Sup, Svp and Swp and the switching signal Swn are shown as deactivation and activation, respectively. Further, in FIG. 10, the switching devices Qun, Qvn and Qwp are always non-conductive and the switching device Qwn is always conductive, and accordingly the switching signals Sun, Svn and Swp and the switching signal Swn are shown as deactivation and activation, respectively.

(Natural Commutation Mode)

The natural commutation mode is the mode in which rectification is performed only by the first diode group without performing comparison with the carrier as a result of the fact that the first switching device group is all rendered conductive.

As is apparent from the description above, the result is that commutation of the converter 4 in the second commutation mode is not dependent on the operation of the first switching device group. Specifically, the line voltage commands Vrs*, Vst* and Vtr* shown in FIG. 7 that are equivalent to the line current commands of the converter 4 have a rectangular wave of a pattern that is commonly referred to as 120-degree conduction. Accordingly, the mode of the rectification in this pattern is equivalent to the mode in which the first switching device group is all rendered conductive and rectification is performed only by the first diode group. Accordingly, the natural commutation mode and the second commutation mode are common in 120-degree conduction and are interchangeable. In the present application, the commutation mode of the converter 6 that achieves 120-degree conduction as described above is referred to as a 120-degree conduction mode. Note that control of a power converting apparatus by 120-degree conduction is described in "AC/AC Power Conversion Based on Matrix Converter Topology with Unidirectional Switches" as well.

Similarly to the second commutation mode, as a result, the comparison between the carrier C and the value drt is not required also in commutation of the converter 6 in the natural commutation mode.

Figure 11:
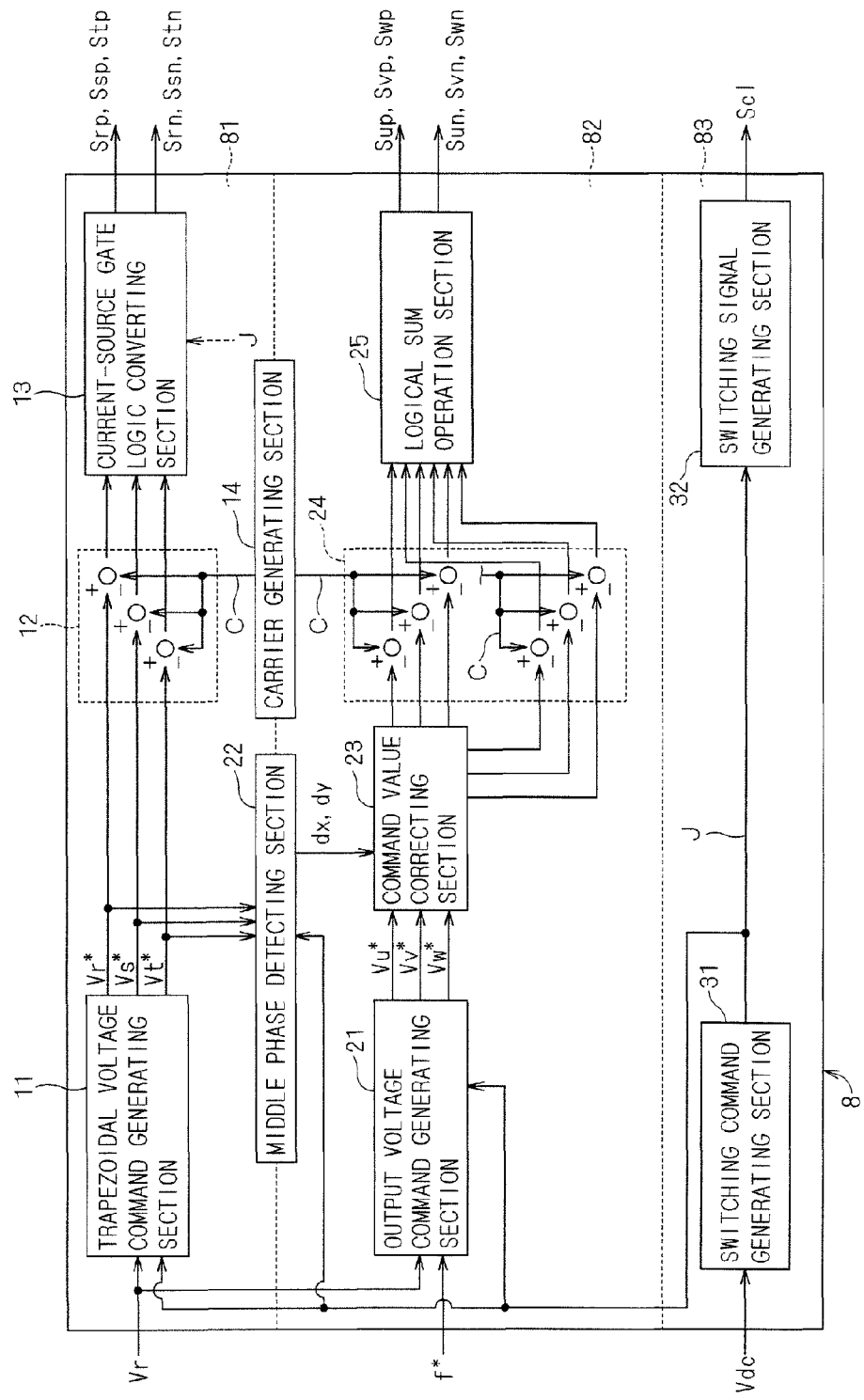
FIG. 11 is a block diagram showing a conceptual example of a control section for performing commutation of a converter and an inverter.

Next, a specific configuration for performing the above-mentioned switching is described by way of example. FIG. 11 is a block diagram showing a conceptual example of a control section 8 for performing commutation of the converter 4 and commutation of the inverter 6. The control section 8 is roughly divided into a converter commutation signal generating section 81, an inverter commutation signal generating section 82 and a switching signal generating section 83.

(Commutation of Converter 4)

The converter commutation signal generating section 81 receives a voltage Vr (in particular, phase thereof) of the input end Pr and outputs switching signals Srp, Ssp, Stp, Srn, Ssn and Stn. The switching devices Qrp, Qsp, Qtp, Qrn, Qsn and Qtn are rendered conductive/non-conductive by activation/deactivation of the switching signals Stp, Ssp, Stp, Srn, Ssn and Stn, respectively.

The inverter commutation signal generating section 82 receives the voltage Vr (in particular, phase thereof) and a command value f* of an operation frequency and outputs the switching signals Sup, Svp, Swp, Sun, Svn and Swn.

The switching signal generating section 83 generates a switching signal Scl based on the DC link voltage Vdc (desirably, an average value obtained by removing fluctuations due to pulse width modulation from the DC link voltage Vdc) that is the voltage between the DC power supply lines LH and LL. The shorting switch Qcl is rendered conductive/non-conductive in accordance with activation/deactivation of the switching signal Scl, respectively.

The converter commutation signal generating section 81 includes a trapezoidal voltage command generating section 11, a comparator 12 and a current-source gate logic converting section 13. While detailed descriptions thereof are omitted because operations thereof are publicly-known technology in Japanese Patent Application Laid-Open No. 2007-312589 and WO 2007/123118, outlines thereof are as follows.

The trapezoidal voltage command generating section 11 generates the phase voltage commands Vr*, Vs* and Vt* having a trapezoidal wave based on, for example, a predetermined table. For example, a slope area of a trapezoidal wave employed in the first commutation mode is represented by $\pm\sqrt{3}\cdot\tan(\theta)$ by normalizing the amplitude thereof ($\theta$ is a phase determined for each phase based on the phase of the voltage Vr, which is $-\pi/6 \leq \theta \leq \pi/6$). The phase voltage commands Vr*, Vs* and Vt* employed in the second commutation mode have a steep slope in the vicinity of places where values thereof change.

The comparator 12 outputs results of the comparison between the carrier C and the phase voltage commands Vr*, Vs* and Vt*, and the current-source gate logic converting section 13 generates the switching signals Srp, Ssp, Stp, Srn, Ssn and Stn based on those results. The generation thereof is described below.

"PWM Scheme for Current Source Three-Phase Inverters and Converters" above suggests the correspondence relationship between switching based on the line current command value and switching based on the phase current command value in view of the duality of the phase voltage of a voltage-source inverter and the phase current of a current-source inverter and the duality of the line voltage of a voltage-source inverter and the line current of a current-source inverter.

FIG. 12 is a circuit diagram showing the configuration of a virtual inverter considered here. The inverter is provided for considering switching of the converter 4 and has no direct relevance to the inverter 6, and thus terms of a-phase, b-phase and c-phase are used for three-phase, AC. The inverter includes a switch device Qap and a switch device Qan on a high-arm side of the a-phase and a low-arm side thereof, respectively. Similarly, the inverter includes switch devices Qbp and Qbn in the b-phase and switch devices Qcp and Qcn in the c-phase.

A line current of the a-phase is determined by a difference between a phase current ica between the a-phase and the c-phase and a phase current iba between the b-phase and the a-phase, and thus the a-phase current flows only in a case of performing switching for causing the pair of phase currents. The same holds true for line currents of other phases. Therefore, a symbol Sjk represents whether or not a phase current ijk flows through the switch devices on the upper-arm side, and a symbol SjkB represents whether or not the phase current ijk flows through the switch devices on the lower-arm side. Here, the symbols j and k represent symbols a, b and c though they are different from each other, and whether the phase current ijk "flows"/"does not flow" is indicated by a binary logic "1"/"0" taken by the symbols Sjk and SjkB.

When the inverter causes the line current to flow based on the comparison between a phase voltage command and a carrier, if the switch commands for controlling conduction/non-conduction of the switch device Qjp on a high-arm side and the switch device Qjn on a low-arm side are represented by symbols $Sj^+$ and $Sj^-$, respectively, the descriptions of "PWM Scheme for Current Source Three-Phase Inverters and Converters" are shown by the following conversion equations: $Sa^+=Sac\cdot SbaB$, $Sb^+=Sba\cdot ScbB$, $Sc^+=Scb\cdot SacB$, $Sa^-=Sba\cdot SacB$, $Sb^-=Scb\cdot SbaB$ and $Sc^-=Sac\cdot ScbB$.

Further, in view of the duality of the phase voltage of a voltage-source inverter and the phase current of a current-source inverter, it is found that logical values of the right sides of the equations above are obtained as results of the comparison between the phase voltage of a voltage-source inverter and a carrier. According to "PWM Scheme for Current Source Three-Phase Inverters and Converters", a command value of a phase current ijk corresponds to a command value of a phase voltage Vj. Accordingly, the logic of the symbol Sjk coincides with the logic for rendering the switch device Qjp conductive by the comparison between the phase voltage command Vj* and the carrier, and the logic of the symbol SjkB coincides with the logic for rendering the switch device Qjn conductive by the comparison between the phase voltage command Vj* and the carrier.

The logic of the symbol SbaB coincides with the logic for rendering the switch devices Qap and Qbp conductive by the comparison between the phase voltage command Vb and the carrier, and the logic of the symbol Sba coincides with the logic for rendering the switch devices Qbp and Qap conductive by the comparison between the phase voltage command Vb and the carrier. More specifically, the switch device Sap is rendered conductive in a case where the phase voltage command Vb is equal to or less than the carrier C, and the switch device Qbp is rendered conductive in the above-mentioned case. Symbols $Sa^+$ and $Sb^+$ represent the periods in which the switch devices Qap and Qbp are conductive when the line current is caused to flow, respectively.

Description is now given of, by replacing the phase voltage commands Vr*, Vs* and Vt* shown in FIG. 2 by voltage commands Va*, Vb* and Vc*, the voltage commands Va*, Vb* and Vc* in the range of phase angle of 0 to 60 degrees. The voltage commands Va* and Vc* take values 1 and −1, respectively, and thus Sac=1, SacB=0, Scb=0 and ScbB=1. Accordingly, $Sa^+=SbaB$, $Sb^+=Sba$ and $Sc^+=Sa^-=Sb^-=0$.

In other words, when the a-phase, b-phase and c-phase are replaced by the r-phase, s-phase and t-phase, respectively, the switch device Qrp is rendered conductive in a case where the phase voltage command Vs* is equal to or less than the carrier C, and the switch device Qsp is rendered conductive in a case where the phase voltage command Vs* is equal to or more than the carrier C. In view of a fact that a minimum value of the carrier C is zero, a value of the voltage command signal Vs corresponds to the period in which the switch device Qrp is conductive.

From the above, the value of the phase voltage command Vs is a reference value drt when a command value to be compared with the carrier C is obtained. The reference value drt defines the Commutation timing when the switch devices Qrp and Qsp of the converter 4 are alternately rendered conductive during periods proportional to a ratio between the values drt and dst. Similarly at other phase angle, the description above holds true for the values of the voltage commands Vr* and Vt*.

Referring back to FIG. 11, the results obtained by the comparison between the carrier C and the phase voltage commands Vr*, Vs* and Vt* determined as described above are provided from the comparator 12 to the current-source gate logic converting section 13. Then, the conversion is performed in accordance with the conversion equations above, whereby the switching signals Srp, Ssp, Stp, Srn, Ssn and Stn are obtained.

The carrier generating section 14 that generates the carrier C may be provided in the converter commutation signal generating section 81 or may be provided in the inverter commutation signal generating section 82 described below. Alternatively, it may be regarded to belong to both of them.

(Commutation of Inverter 6)

The inverter commutation signal generating section 82 includes an output voltage command signal generating section 21, a middle phase detecting section 22, a command value correcting section 23, a comparator 24 and a logical sum operation section 25. The operation of the inverter commutation signal generating section 82 is publicly known by Japanese Patent Application Laid-Open No. 2007-312589 and WO 2007/123118, and hence brief description is given.

The middle phase detecting section 22 judges which of the phase voltage commands Vr*, Vs* and Vt* corresponds to a so-called middle phase. As to the first commutation mode, the phase voltage command Vs* corresponds to the middle phase at the phase angle of 0 to 60 degrees illustrated in FIG. 2. Then, a ratio drt:dst is determined in view of a value of the phase voltage command Vs*, and the values drt and dst are provided to the command value correcting section 23. The ratio therebetween differs according to which phase voltage command corresponds to the middle phase, and thus in FIG. 11, values corresponding to the values drt and dst are shown as correction values dx and dy, respectively, including the case where the phase voltage commands Vr* and Vt* are middle phases. Description is given below in this manner as well.

Note that in a case of employing the second commutation mode or the natural commutation mode, the period in which the middle phase exists is extremely short. Therefore, in actuality, extraction is made as to which of the line voltage commands Vrs*, Vst* and Vtr* uniquely determined from the phase voltage commands Vr*, Vs* and Vt* is a middle phase. For example, the line voltage command Vst* is the middle phase at the phase angle of 0 to 30 degrees, and the value dst is set to zero on this occasion. The line voltage command Vrs* is the middle phase at the phase angle of 30 to 90 degrees, and the value drt is set to zero on this occasion.

The middle phase detecting section 22 may be provided in the inverter commutation signal generating section 82 or may be provided in the converter commutation signal generating section 81 described above. Alternatively, it may be regarded to belong to both of them.

The output voltage command generating section 21 receives the voltage Vr (in particular, phase thereof) and the command value f* of an operation frequency and generates the voltage command values Vu*, Vv* and Vw* of the inverter 6. The generation of the voltage command values Vu*, Vv* and Vw* as described above are well known technology, and thus description thereof is omitted.

The command value correcting section 23 generates a value to be compared with the carrier C for commutation of the inverter 6 based on the voltage command values Vu*, Vv* and Vw* and the correction values dx and dy. Referring to FIG. 5 (that is, taking a case where the phase voltage command Vs* is the middle phase as an example), the command value correcting section 23 calculates, based on the voltage command values Vu*, Vv* and Vw*, the values d0, d4 and d6 (=1−d0−d4) and generates, based on those and the values drt and dst, values drt (1−d0−d4), drt (1−d0), drt+dst·d0 and drt+dst(d0+d4). In addition, the command value correcting section 23 outputs the values 0 and drt+dst. Those values are compared with the carrier C by the comparator 24, and the results thereof are input to the logical sum operation section 25. Then, the logical sum operation section 25 performs operation based on the comparison results by the comparator 24, to thereby generate the switching signals Sup, Svp, Swp, Sun, Svn and Swn.

(Switching of Commutation Mode)

The switching signal generating section 83 includes a switching command generating section 31 and a switching signal generating section 32. The switching command generating section 31 judges switching between the first commutation mode and the second commutation mode (or natural commutation mode) based on the DC link voltage Vdc in accordance with the criteria described below, thereby generating a switching command J.

The trapezoidal voltage command generating section 11 switches between types of the trapezoidal waves shown by the phase voltage commands Vr*, Vs* and Vt* to be output in accordance with the switching command J. Further, in actuality, in detection of the middle phase of the middle phase detecting section 22, the middle phase of the phase voltage commands Vr*, Vs* and Vt* is preferably detected in the first commutation mode and the middle phase of the line voltage commands Vrs*, Vst* and Vtr* is preferably detected in the second commutation mode, as described above. Therefore, the middle phase detecting section 22 may switch between middle phases of the phase voltage command and the line voltage command to be detected in accordance with the switching command J.

Note that in a case where the natural commutation mode is employed in place of the second commutation mode, the first switching device group is all rendered conductive. Accordingly, the converter commutation signal generating section 81, the inverter commutation signal generating section 82 and the switching signal generating section 83 are not required to function as described above in actuality, and the switching signals Srp, Ssp, Stp, Srn, Ssn and Stn may by all activated. For example, as indicated by a dashed arrow in FIG. 11, the current-source gate logic converting section 13 is provided with the switching command J. In a case where the switching command J sets the first commutation mode, the current-source gate logic converting section 13 operates as described above. In a case where the switching command J sets the natural commutation mode, the current-source gate logic converting section 13 outputs the switching signals Srp, Ssp, Stp, Srn, Ssn and Stn that have all been activated.

Note that from a standpoint of apparatus design, generating waveforms of the phase voltage commands Vr*, Vs* and Vt* for the second commutation mode is more advantageous than causing the switching signal generating section 83 to perform a particular operation for the natural commutation mode. That is, the converter 4 performs commutation by the comparison between trapezoidal waves and a carrier in both of the first and second commutation modes, and accordingly design does not need to be performed individually in accordance with those commutation modes.

On the other hand, there is another advantage that it is not required to make comparison between trapezoidal waves and a carrier when the natural commutation mode is employed for the 120-degree commutation mode.

In a case where the switching command J sets the first commutation mode as the commutation mode of the converter 4, the switching signal generating section 32 deactivates the switching signal Scl. Further, in a case where the switching command J sets the second commutation mode or the natural commutation mode as the commutation mode of the converter 4, the switching signal generating section 32 activates the switching signal Scl.

From the above, even in a case where the shorting switch Qcl is rendered conductive to stop an essential function of the clamp circuit 5 or even in a case where the shorting switch Qcl is not rendered conductive to cause the clamp circuit 5 to exert an essential function, the commutation mode of the converter 4 is appropriately changed so as to make absorption of the regenerative current and direct AC power conversion compatible with each other.

Description is now given below as to which of the first commutation mode and the second commutation mode (or natural commutation mode) is set by the switching command J in which specific case.

(Reduction in Power Factor of Load Connected to Output Ends)

First, description is given of the technology in which the second commutation mode (or natural commutation mode) is employed as the commutation mode of the converter 4 when the power factor of the load 7 (see FIG. 1) (hereinafter, merely referred to as "load power factor") connected to the output ends Pu, Pv and Pw reduces.

As described in Japanese Patent No. 3806872, the power factor reduces in a case where errors in estimating a rotation position of a rotary machine are reduced by being set to a lagging phase. FIG. 13 is a graph showing the relationship between the load power factor and the clamp voltage supported by the clamp circuit 5 when the shorting switch Qcl is not conductive. Note that the power supply voltage is 415 V (error of ±10%). A horizontal axis represents a load phase angle that is the arc tangent of the load power factor. In the clamp circuit 5, the capacitors 51 and 52 are connected in series with each other when being charged and are connected in parallel with each other when being discharged, and thus the clamp voltage is indicated by two graphs.

When the load power factor is 0.5 or more, the clamp voltage during charging can be made to be equal to or less than 415×√3×√2=1,000 (V) or less that is a crest value of the line voltage (the clamp voltage during discharging is equal to or less than a crest value of the power supply voltage).

However, when the load power factor is significantly reduced to 0.2, the regenerative current becomes equal to the current during power running, and the charge current to the clamp circuit 5 increases. Accordingly, the clamp voltage during discharging reaches approximately 650 V that is close to the crest value of the power supply voltage. In order to avoid such a state, the shorting switch Qcl is desired to be rendered conductive in a case of a low load power factor. This is because it is aimed to circulate the current during power running and the regenerative current by stopping an essential function of the clamp circuit 5 to make the clamp circuit 5 have mere series connection between the capacitors 51 and 52.

However, in a case where the capacitors 51 and 52 are merely connected in series in the clamp circuit 5, the current is difficult to be output even when the converter 4 performs commutation in the first commutation mode. This is because even the voltage during discharging of the clamp circuit 5 cannot be lowered.

More specifically, the line voltage commands illustrated in FIG. 3, which are employed in the first commutation mode, are equivalent to the line current commands of the converter 4 as described above, where two switching patterns are mixed. For example, at the phase angle of 0 to 60 degrees, switching patterns respectively corresponding to the line voltage commands Vrs* and Vst* are mixed. In this case, if the series connection between the capacitors 51 and 52 is charged to a higher potential than a lower potential of the input ends Pr and Ps, it is difficult to supply the current from the converter 4 to the inverter 6 by, for example, the functions of the diodes Drp and Dsp of the clamp circuit 5.

In contrast, in the second commutation mode or the natural commutation mode, the current flows in the pattern of 120-degree conduction, and thus one to which the phase voltage corresponding to a maximum phase among the input ends Pr, Ps and Pt is applied is connected to the DC power supply line LH. Accordingly, the current can be surely supplied from the converter 4 to the inverter 6. That is, it is possible to avoid a malfunction in the first commutation mode resulting from the regenerative current that increases as the power factor reduces, and hence direct AC power conversion can be achieved.

Accordingly, it is desired to render the shorting switch Qcl conductive in a case where the load power factor falls below a predetermined value and employ the second commutation mode (or natural commutation mode). More specifically, the second commutation mode or the natural commutation mode is employed at the timing when the shorting switch Qcl is rendered conductive in the state in which the first commutation mode is employed. Note that the first commutation mode is employed at and after the time when the shorting switch Qcl is rendered non-conductive.

As is understood from FIG. 13, the load power factor can be estimated by detecting the clamp voltage supported by the capacitor. Alternatively, the load power factor can be estimated by detecting the DC link voltage Vdc because fluctuations in clamp voltage affect the magnitude of the DC link voltage Vdc. Therefore, as shown in FIG. 11, the switching command generating section 31 can generate the switching command J by receiving the DC link voltage Vdc (or clamp voltage), obtaining an average value Vdc1 from this, and comparing the average value Vdc1 with a threshold value corresponding to the predetermined value of the load power factor.

Alternatively, as shown in FIG. 6(*d*) of Japanese Patent Application Laid-Open No. 2007-295686, a phase angle at which the current polarity is reversed delays by π/6 with respect to the current phase angle. As shown in FIG. 6(*e*) of Japanese Patent Application Laid-Open No. 2007-295686, the phase angle of output voltage of the inverter is known, and thus the magnitude of power factor can be estimated based on the phase of a load current that is detected from a difference of those phase angles. That is, it is possible to generate the switching command J by inputting, as an input to the switching command generating section 31, the zero cross of inverter output current and the output voltage of an inverter in place of the DC link voltage Vdc shown in FIG. 11, and comparing a phase difference therebetween with a threshold value corresponding to a predetermined value of the load power factor. FIG. 6(*d*) and (*e*) of Japanese Patent Application Laid-Open No. 2007-295686 are shown as FIG. 14. Graphs I_V4 and I_V6 show DC currents flowing when the inverter takes the voltage vectors V4 and V6, respectively, and graphs t4 and t6 show duty ratios when the inverter takes the voltage vectors V4 and V6, respectively.

Still alternatively, in view of the fact that the operation for reducing errors in estimating a rotation position of a rotary machine with a lagging phase is employed at the beginning of activation, it is preferred that the shorting switch Qcl be rendered conductive at the beginning of activation to employ the second commutation mode or the natural commutation mode at this timing. Then, the converter 4 performs commutation in accordance with the second commutation mode or the natural commutation mode until a lapse of a predetermined period, and the shorting switch Qcl is rendered non-conductive after a lapse of the predetermined period. It suffices that the first commutation mode is employed after this time. In a case where the load 7 is a rotary machine, it is possible to take measures against a reduction in power factor resulting from the current that is to have a lagging phase for detecting a position at the beginning of activation in this manner.

Note that it is possible to use a so-called CD snubber without providing the diodes 53 and 54 in the clamp circuit 5 as described above. In this case, however, the clamp circuit 5 does not function effectively even when the shorting switch Qcl is rendered non-conductive unless the load power factor is $\sqrt{3}/2$ or more. Therefore, the period in which the switching command J selects the first commutation mode is desired to be delayed until the load power factor becomes $\sqrt{3}/2$ or more.

(Instantaneous Voltage Drop of Power Supply Connected to Input Ends)

FIG. 15 is a graph showing the relationship between the clamp voltage supported by the clamp circuit 5 and the load power factor when the shorting switch Qcl is not conductive, similarly to FIG. 13. Note that the power supply voltage is lower compared with the case shown in FIG. 13, and thus the clamp voltage is lower as well.

When the three-phase AC voltage to be input to the converter 4 disappears due to an instantaneous blackout, the capacitors 51 and 52 are discharged by being connected in parallel in the clamp circuit 5, whereby the clamp voltage is reduced by one-half. In particular, in a case where the load 7 is a rotary machine, reduced clamp voltage weakens an interlinkage magnetic flux of the rotary machine. Accordingly, there is a fear that the current may be increased to stop the inverter 6 or an operation may be stopped due to loss of synchronism.

FIG. 16 is a graph showing an operation in a case where the clamp circuit 5 functions even during an instantaneous blackout. The power supply voltage generated by the power source 1 is 50 Hz 400V, and there is illustrated a case where a blackout occurs during only a ¼ cycle.

Power supply phase voltages Vr, Vs and Vt represent the voltages at the input ends Pr, Ps and Pt, respectively, power supply line currents Ir, Is and It represent the currents flowing from the capacitor group 3 into the input ends Ir, Is and It, respectively, a clamp circuit series voltage Vc represents a sum of voltages supported by the capacitors 51 and 52 in the clamp circuit 5, the DC link voltage Vdc represents the voltage between the DC power supply lines LH and LL, the load line voltage represents a difference of the voltages Vu, Vv and Vw applied to the output ends Pu, Pv and Pw (note that a difference Vuv between the voltages Vu and Vv is shown), and load line currents Iu, Iv and Iw represent the currents flowing from the output ends Pu, Pv and Pw to the load 7, respectively.

The power supply phase voltages Vr, Vs and Vt all become zero, and thus the power supply line currents Ir, Is and It converge on zero with ringing. As to the DC link voltage Vdc, the voltages supported by the capacitors 51 and 52 are merely maintained, and accordingly it reduces. Along with this, the load line voltage Vuv also reduces by one-half, whereby the load line currents Iu, Iv and Iw are disturbed considerably.

Then, the shorting switch Qcl is desirably short-circuited upon an instantaneous blackout. Specifically, the switching signal Scl is activated at the timing when an average value Vcdl of the DC link voltage Vdc falls below a first threshold value (for example, 400 V). The generation of the switching command J in this case is descried above.

Figure 17:
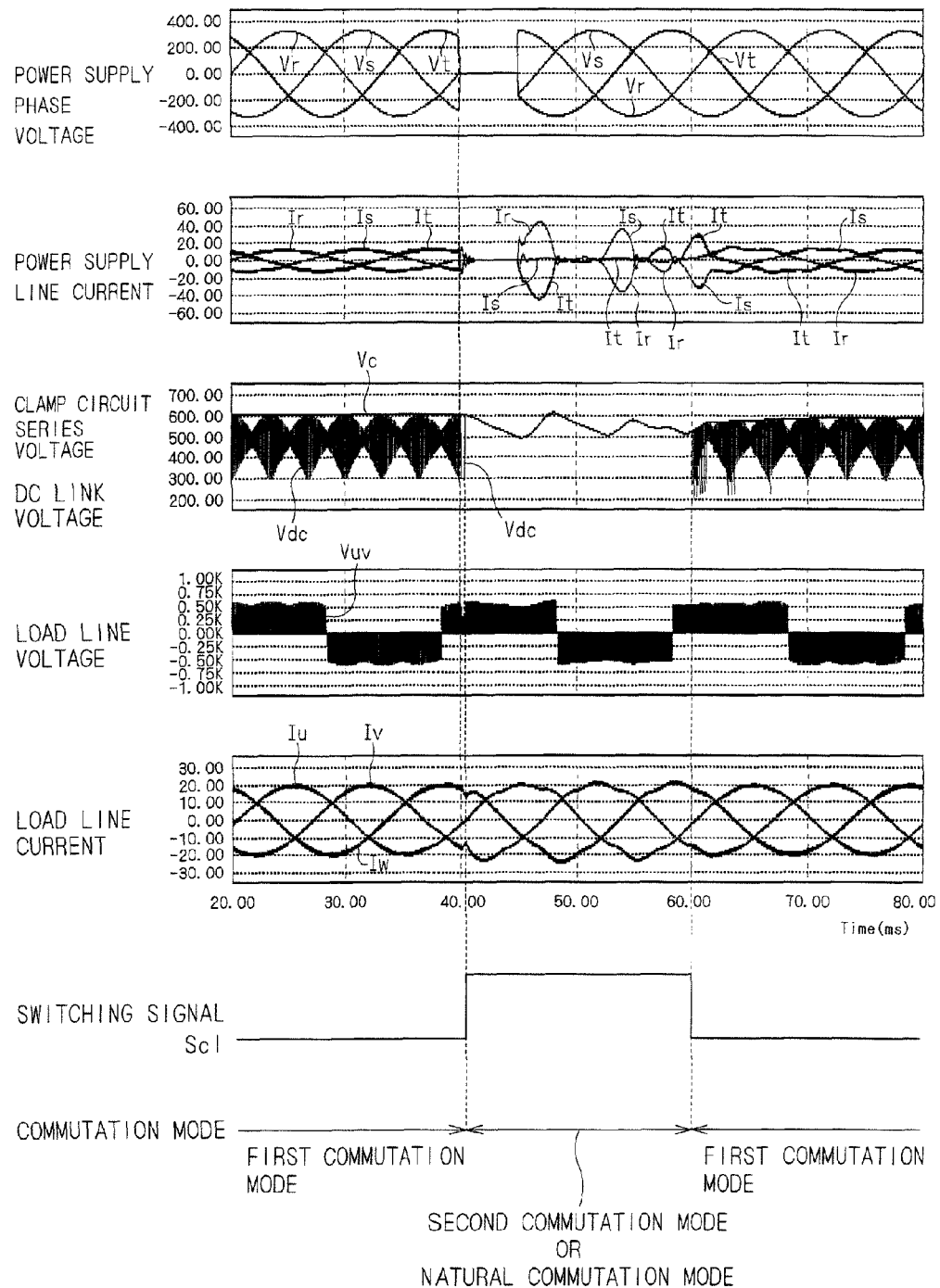
FIG. 17 is a graph showing an operation of switching commutation modes of a converter.

FIG. 17 and FIG. 18 are graphs each showing operations in a case where the switching signal Scl is activated as described above such that the commutation mode of the converter 4 is set to 120-degree conduction mode (second commutation mode or natural commutation mode) when the switching signal Scl is activated and that the commutation mode of the converter 4 is set to the first commutation mode when the switching signal Scl is deactivated. There is illustrated a case where, similarly to FIG. 16, the power supply voltage generated by the power source 1 is 50 Hz 400V, and a blackout occurs during only a ¼ cycle.

In both of them, the capacitors 51 and 52 are connected in series between the DC power supply lines LH and LL while the switching signal Scl is activated, whereby the DC link voltage Vdc coincides with the clamp circuit series voltage Vc.

Further, the converter 4 performs commutation in a 120-degree conduction mode while the switching signal Scl is activated, and eventually the clamp voltage Vc (DC link voltage Vdc) rises.

Note that FIG. 17 illustrates a case where the switching signal Scl is deactivated after the DC link voltage Vdc keeps a value exceeding a second threshold value (this is equal to or more than the first threshold value, for example, 450 V) for a predetermined period. FIG. 18 illustrates a case where the switching signal Scl is deactivated at the timing when the DC link voltage Vdc exceeds the second threshold value (this is equal to or more than the first threshold value, for example, 600 V).

The operation shown in FIG. 17 is advantageous in that the DC link voltage Vdc does not excessively increase when shifting to the first commutation mode, and the DC link voltage Vdc is difficult to excessively increase after that. The operation shown in FIG. 18 is advantageous in fewer times when ringing occurs in the power supply line currents Ir, Is and It.

FIG. 19 is a graph showing an operation accompanying an instantaneous blackout as well. In this operation, as in the operations shown in FIG. 17 and FIG. 18, the switching signal Scl is activated at the timing when the average value Vdc1 of the DC link voltage Vdc falls below the first threshold value (for example, 400 V). The operation shown in FIG. 19 is similar to the operation shown in FIG. 18 in that the switching signal Scl is deactivated at the timing when the DC link voltage Vdc exceeds the second threshold value (this is equal to or more than the first threshold value, for example, 600 V).

Note that in the operation shown in FIG. 19, a delay is provided for a predetermined period of time between deactivation of the switching signal Scl and shift to the 120-degree conduction mode. That is, the operations shown in FIG. 17 to FIG. 19 are common in that the first commutation mode is employed at and after the time when the shorting switch Qcl is rendered non-conductive. However, the operation shown in FIG. 19 is different from the operations shown in FIG. 17 and FIG. 18 in that the first commutation mode is employed at and after the time when the shorting switch Qcl is rendered non-conductive and after a lapse of a predetermined period of time. The delay in predetermined period of time as described above is achieved by counting time in the trapezoidal voltage command generating section 11 even when the switching command J sets the first commutation mode.

In the operation shown in FIG. 19, a 120-degree conduction mode is employed in commutation of the converter 4 between deactivation of the switching signal Scl and shift to a 120-degree conduction mode. In this manner, when the 120-degree conduction mode is employed for commutation of the converter in a case where the clamp circuit functions, though the power supply line currents Ir, Is and It are disturbed considerably, the DC link voltage Vdc is not damaged.

Accordingly, even in a case where the shorting switch Qcl is not provided, commutation may be performed in the converter by detecting the DC link voltage Vdc to detect a blackout, and employing a 120-degree conduction mode during the blackout.

Note that the timing at which the switching signal Scl is activated may be determined not only using the average value Vdc1 but also using the DC link voltage Vdc itself. As shown in FIG. 16, and as described with reference to FIG. 20, the DC link voltage Vdc changes between envelopes by switching of the converter 4. Therefore, when the first threshold value is set to, for example, 400 V as described above, the DC link voltage Vdc discretely takes values smaller than the first threshold value even during normal operation.

Therefore, in order to determine the timing at which the switching signal Scl is activated merely using the DC link voltage Vdc, it suffices that the sensitivity of the switching command generating section 31 to the DC link voltage Vdc is reduced. Specifically, it suffices that a longer period of time is required for the switching command generating section 31 to recognize the magnitude of the DC link voltage Vdc. For example, the switching command J is generated when the DC link voltage Vdc keeps the first threshold value or smaller value for a predetermined period of time, whereby the shorting switch Qcl is rendered conductive.

Needless to say, comparison between the average value Vdc1 and the first threshold value is advantageous in that the DC link voltage Vdc does not need to be measured for a predetermined period of time.

The switching command generating section 31 may be responsible for the function of obtaining the average value Vdc1 from the DC link voltage Vdc. Alternatively, an operation section or an integrator circuit that is separately provided may be responsible for that function, and the average value Vdc1 may be input to the switching command generating section 31.

While the invention has been shown and described in detail, the foregoing description is in all aspects illustrative and not restrictive. It is therefore understood that numerous modifications and variations can be devised without departing from the scope of the invention.

The invention claimed is:

1. A power converting apparatus, comprising:
   three input ends respectively receiving a phase voltage of three-phase AC;
   three output ends;
   first and second DC power supply lines;
   a current-source converter including a first switching device group including three switching devices connected between each of said input ends and said first DC power supply line and three switching devices connected between each of said input ends and said second DC power supply line;
   a voltage-source inverter including a second switching device group including three switching devices connected between each of said output ends and said first DC power supply line and three switching devices connected between each of said output ends and said second DC power supply line; and
   a clamp circuit including a clamp diode, a capacitor and a shorting switch, the clamp diode having an anode and a cathode connected to said first and second DC power supply lines, respectively, the capacitor being connected in series with said clamp diode between said first and second DC power supply lines, the shorting switch being connected in parallel with said clamp diode, wherein:
   said converter performs commutation in accordance with any of a first commutation mode and a 120-degree conduction mode determined by results of comparison between a carrier and three trapezoidal waves having a 360-degree cycle and a phase different from each other by 120 degrees;
   in said first commutation mode, each of said trapezoidal waves has a pair of flat sections continuous for a 120-degree section and a pair of slope areas linking the pair of flat sections for a 60-degree section;
   said converter performs commutation by comparison between said carrier and said trapezoidal waves changing between said pair of flat sections in said first commutation mode;
   said 120-degree conduction mode is employed at the timing when said shorting switch is rendered conductive in a state in which said first commutation mode is employed; and
   said first commutation mode is employed at and after the time when said shorting switching is rendered non-conductive.

2. The power converting apparatus according to claim 1, wherein said shorting switch is rendered conductive when a power factor of a load connected to said output ends falls below a predetermined value.

3. The power converting apparatus according to claim 2, wherein:
   said load is a rotary machine; and
   said converter performs commutation in accordance with said 120-degree conduction mode during a predetermined period at the beginning of activation.

4. The power converting apparatus according to claim 1, wherein said shorting switch is rendered conductive when a DC voltage between said first and second DC power supply lines keeps to be a first threshold value or less for a predetermined period.

5. The power converting apparatus according to claim 4, wherein:
   said shorting switch is rendered non-conductive when the DC voltage between said first and second DC power supply lines keeps a value exceeding a second threshold value equal to or more than said first threshold value for a predetermined period; and
   said first commutation mode is employed at the timing when said shorting switch is rendered non-conductive.

6. The power converting apparatus according to claim 4, wherein said shorting switch is rendered non-conductive at the timing when the DC voltage between said first and second DC power supply lines exceeds a second threshold value equal to or more than said first threshold value.

7. The power converting apparatus according to claim 6, wherein said first commutation mode is employed at the timing when said shorting switch is rendered non-conductive.

8. The power converting apparatus according to claim 6, wherein said first commutation mode is employed after a lapse of a predetermined period from non-conduction of said shorting switch.

9. The power converting apparatus according to claim 1, wherein said shorting switch is rendered conductive when an average value is equal to or less than a first threshold value, the average value being obtained by averaging a DC voltage between said first and second DC power supply lines within one cycle of said carrier.

10. The power converting apparatus according to claim 9, wherein:
   said shorting switch is rendered non-conductive when the DC voltage between said first and second DC power supply lines keeps a value exceeding a second threshold value equal to or more than said first threshold value for a predetermined period; and
   said first commutation mode is employed at the timing when said shorting switch is rendered non-conductive.

11. The power converting apparatus according to claim 9, wherein said shorting switch is rendered non-conductive at the timing when the DC voltage between said first and second DC power supply lines exceeds a second threshold value equal to or more than said first threshold value.

12. The power converting apparatus according to claim 11, wherein said first commutation mode is employed at the timing when said shorting switch is rendered non-conductive.

13. The power converting apparatus according to claim 11, wherein said first commutation mode is employed after a lapse of a predetermined period from non-conduction of said shorting switch.

14. The power converting apparatus according to claim 1, wherein:
   in said clamp circuit:
      said capacitor is divided into a first capacitor and a second capacitor connected in series with each other; and
      said anode of said clamp diode is connected to said first DC power supply line via said first capacitor, and said cathode thereof is connected to said second DC power supply line via said second capacitor; and
   said clamp circuit further includes:
      a first diode having an anode connected to said cathode of said clamp diode and a cathode connected to said first DC power supply line; and
      a second diode having a cathode connected to said anode of said clamp diode and an anode connected to said second DC power supply line.

15. The power converting apparatus according to claim 1, wherein:
   said 120-degree conduction mode is a second commutation mode;
   each of said trapezoidal waves has a pair of flat sections continuous for a 180-degree section in said second commutation mode; and
   in said second commutation mode, said converter performs commutation by comparison between said carrier and said trapezoidal waves changing between said pair of flat sections.

16. The power converting apparatus according to claim 1, wherein said 120-degree conduction mode is a natural commutation mode in which said first switching device group is all conductive.

* * * * *